(12) United States Patent
McMillan

(10) Patent No.: US 11,229,982 B2
(45) Date of Patent: Jan. 25, 2022

(54) TOOLING FIXTURES AND SYSTEMS AND METHODS OF SUPPORTING A WORKPIECE DURING MANUFACTURING

(71) Applicant: The Boeing Company, Chicago, IL (US)

(72) Inventor: Daniel J. McMillan, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 310 days.

(21) Appl. No.: 16/261,727

(22) Filed: Jan. 30, 2019

(65) Prior Publication Data

US 2020/0238467 A1 Jul. 30, 2020

(51) Int. Cl.
*B23Q 16/00* (2006.01)

(52) U.S. Cl.
CPC .................................. *B23Q 16/001* (2013.01)

(58) Field of Classification Search
CPC .............................. B23Q 1/035; B23Q 16/001
USPC .................... 269/54, 55, 56, 71, 73, 74, 309
See application file for complete search history.

(56) References Cited

U.S. PATENT DOCUMENTS

| 4,934,671 A | 6/1990 | Laninga et al. |
| 6,637,737 B1 * | 10/2003 | Beecherl ............. B23Q 1/5406 269/289 R |
| 7,891,877 B2 | 2/2011 | Nomi et al. |
| 10,814,440 B1 * | 10/2020 | Spillane ................ B23Q 37/00 |

FOREIGN PATENT DOCUMENTS

IT    558877 A1 *  9/1993

OTHER PUBLICATIONS

THK, "HCR sevier," Global Standard size Model HSR.

* cited by examiner

*Primary Examiner* — Lee D Wilson
*Assistant Examiner* — Alberto Saenz
(74) *Attorney, Agent, or Firm* — Walters & Wasylyna LLC

(57) ABSTRACT

A tooling fixture includes a tilt platform including an indexing point, defining an intersection of orthogonal axes, and a frame assembly coupled to the tilt platform. The frame assembly is configured to support rotational movement of the tilt platform about two of the orthogonal axes. A location of the indexing point is fixed relative to a reference frame during rotational movement of the tilt platform. The frame assembly allows access to the tilt platform from a direction opposite the frame.

20 Claims, 16 Drawing Sheets

TOOLING FIXTURES AND SYSTEMS AND METHODS OF SUPPORTING A WORKPIECE DURING MANUFACTURING

FIELD

The present disclosure is generally related to manufacturing fixtures and, more particularly, to systems and methods for supporting a workpiece during manufacturing using tooling fixtures having an adjustable tilt platform with a fixed indexing point.

BACKGROUND

Tooling fixtures are used to support a workpiece during manufacturing. Often, the tooling fixture is located at a preselected location to properly support the workpiece at an indexing location so that an automated manufacturing operation can be performed on the workpiece. However, when a single workpiece has a variable contour or when multiple workpieces have different contours, it can be difficult or complicated to repeatably and accurately index the tooling fixture to accommodate such contours. Accordingly, those skilled in the art continue with research and development efforts in the field of supporting workpieces during manufacturing and, as such, systems and methods, intended to address the above-identified concerns, would find utility.

SUMMARY

The following is a non-exhaustive list of examples, which may or may not be claimed, of the subject matter according to the present disclosure.

In an example, a disclosed tooling fixture includes a tilt platform including an indexing point, defining an intersection of orthogonal axes, and a frame assembly coupled to the tilt platform. The frame assembly is configured to support rotational movement of the tilt platform about two of the orthogonal axes. A location of the indexing point is fixed relative to a reference frame during rotational movement of the tilt platform. The frame assembly allows access to the tilt platform from a direction opposite the frame.

In an example, a disclosed tooling system for supporting a workpiece during manufacturing includes a plurality of tooling fixtures. Each one of the tooling fixtures includes a tilt platform including an indexing point 106 that defines an intersection of orthogonal axes. The tilt platform is configured to support the workpiece. Each one of the tooling fixtures further includes a frame assembly coupled to the tilt platform. The frame assembly is configured to support rotational movement of the tilt platform about two of the orthogonal axes. A location of the indexing point is fixed relative to a reference frame during rotational movement of the tilt platform. The frame assembly allows access to the tilt platform by the workpiece from a direction opposite the frame.

In an example, a disclosed method of supporting a workpiece during manufacturing includes steps of: (1) locating a tooling fixture in a manufacturing environment, the tooling fixture includes a tilt platform including an indexing point, defining an intersection of orthogonal axes, and a frame assembly coupled to the tilt platform and configured to support rotational movement of the tilt platform about two of the orthogonal axes; (2) locating the indexing point of the tilt platform relative to a reference frame of the manufacturing environment; (3) rotationally moving the tilt platform about at least one of the orthogonal axes; (4) maintaining the indexing point at a fixed location relative to the reference frame when rotationally moving the tilt platform about at least one of the orthogonal axes; and (5) engaging the tilt platform with the workpiece from a direction opposite the frame.

Other examples of the disclosed fixtures, systems, and methods will become apparent from the following detailed description, the accompanying drawings and the appended claims.

DETAILED DESCRIPTION

Figure 1:
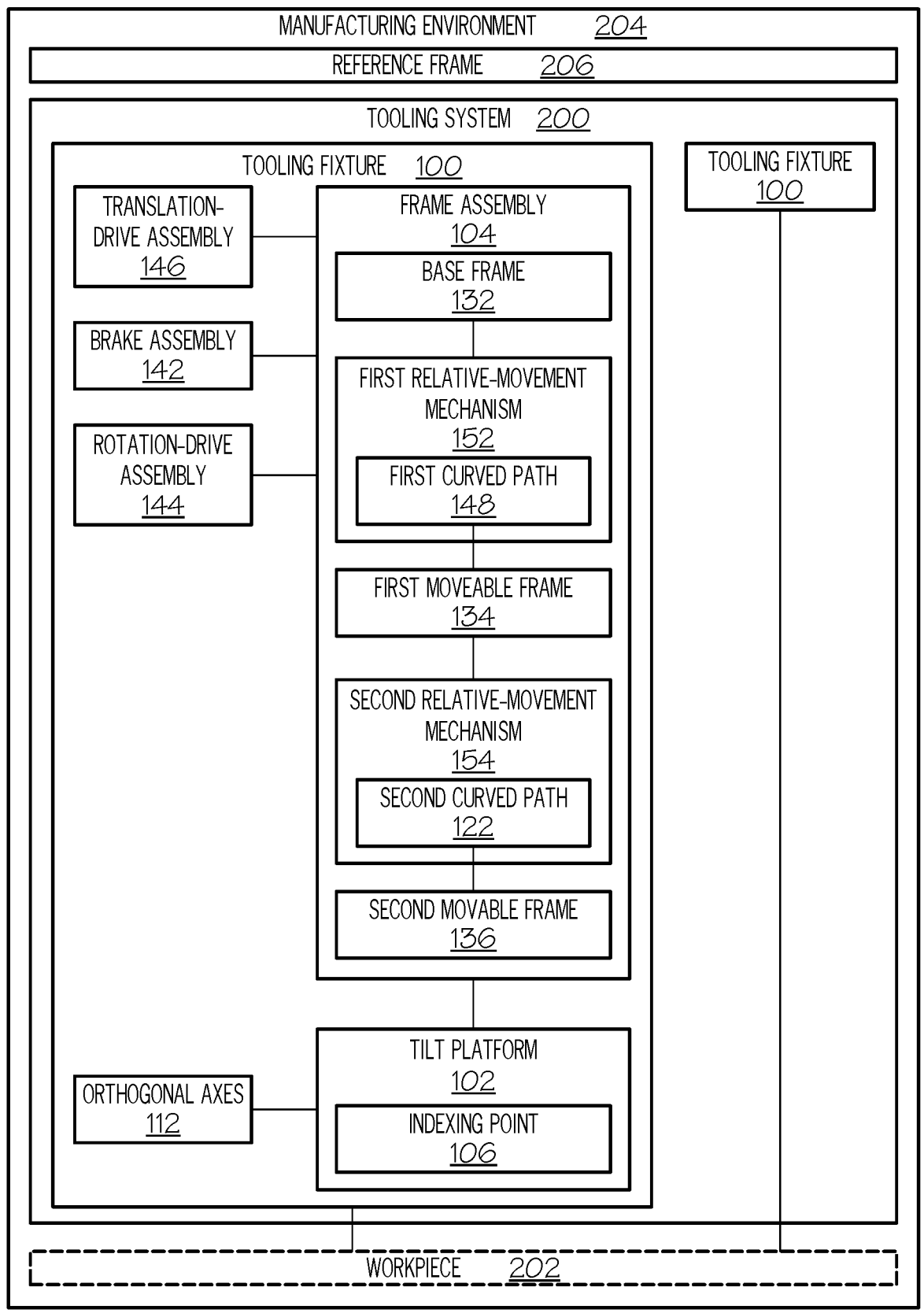
FIG. 1 is a schematic block diagram of an example of a manufacturing environment for a tooling system for supporting a workpiece during manufacturing.

The following detailed description refers to the accompanying drawings, which illustrate specific examples described by the present disclosure. Other examples having different structures and operations do not depart from the scope of the present disclosure. Like reference numerals may refer to the same feature, element, or component in the different drawings.

Illustrative, non-exhaustive examples, which may be, but are not necessarily, claimed, of the subject matter according the present disclosure are provided below. Reference herein to "example" means that one or more feature, structure, element, component, characteristic and/or operational step described in connection with the example is included in at least one embodiment and/or implementation of the subject matter according to the present disclosure. Thus, the phrases "an example," "another example," "one or more examples," and similar language throughout the present disclosure may, but do not necessarily, refer to the same example. Further, the subject matter characterizing any one example may, but does not necessarily, include the subject matter characterizing any other example.

Referring generally to FIG. 1 and particularly to FIGS. 2-13, examples of a tooling fixture 100 are disclosed. In an example, the tooling fixture 100 includes a tilt platform 102. The tilt platform 102 includes an indexing point 106. The indexing point 106 defines (or is defined by) an intersection of orthogonal axes 112. The tooling fixture 100 also includes a frame assembly 104. The frame assembly 104 is coupled to the tilt platform 102. The frame assembly 104 is configured to support rotational movement of the tilt platform 102 about two of the orthogonal axes 112. A location of the indexing point 106 is fixed relative to a reference frame 206 during rotational movement of the tilt platform 102. The frame assembly 104 allows or provides access to the tilt platform 102 from a direction opposite the frame assembly 104. In particular, the frame assembly 104 allows or enables unobstructed access (i.e., does not obstruct access) to the tilt platform 102 from a direction opposite the frame assembly 104.

Figure 2:
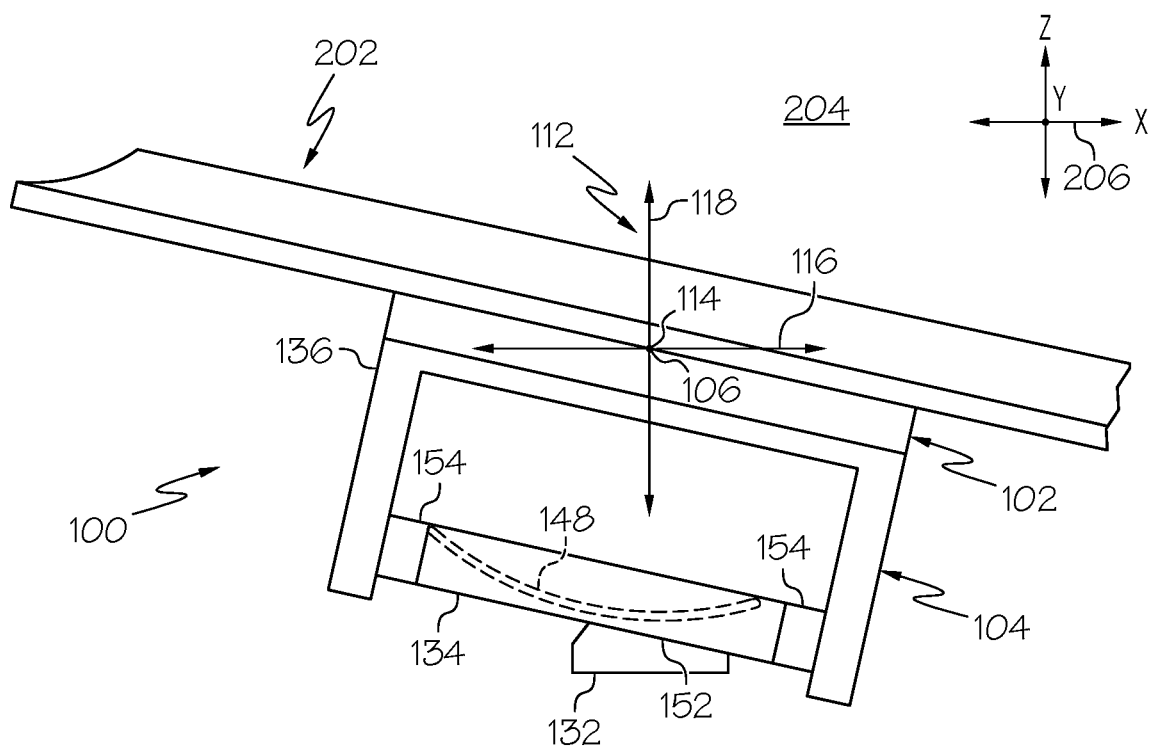
FIG. 2 is a schematic, side-elevational view of an example of a tooling fixture of FIG. 1.
Figure 3:
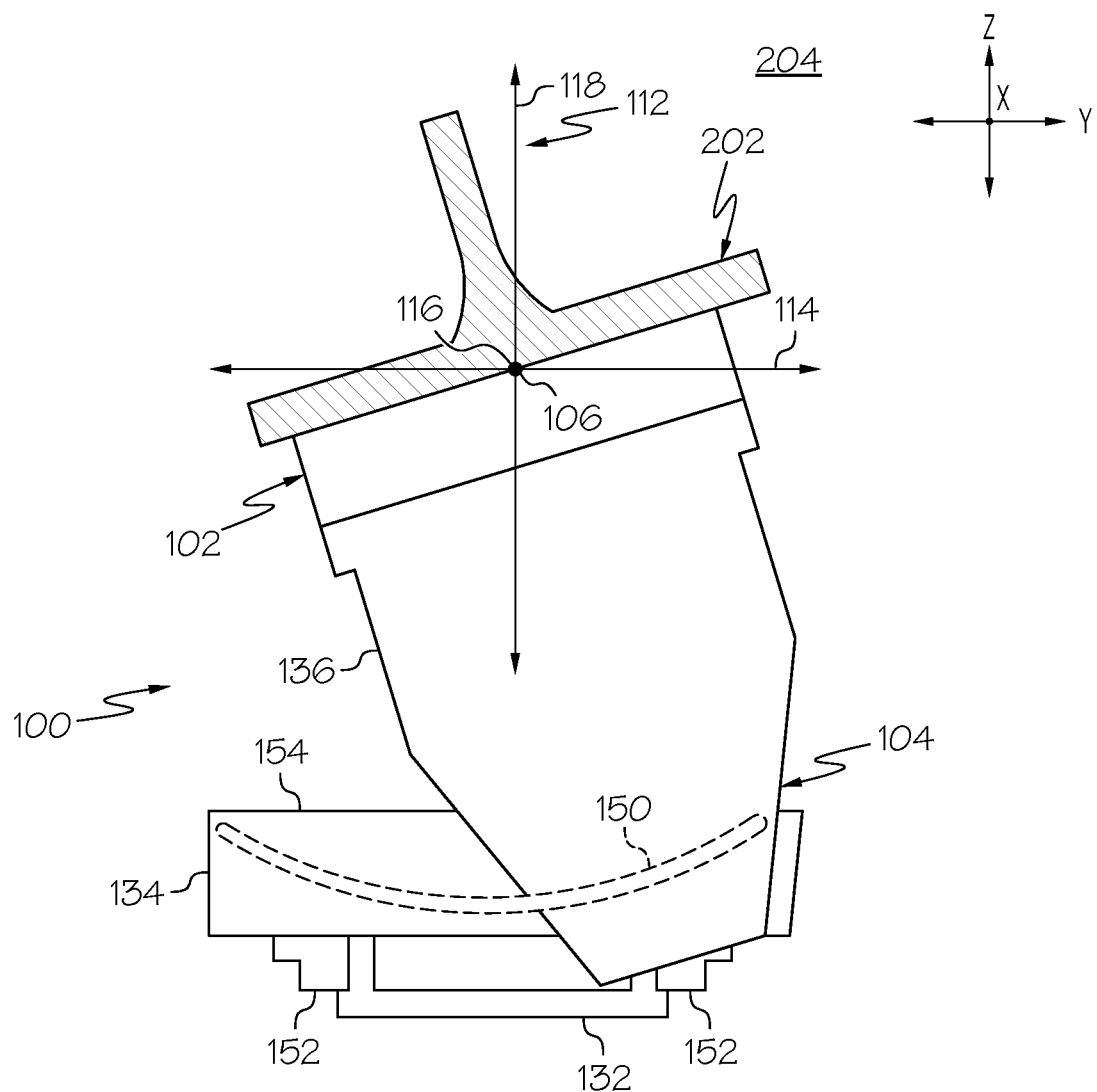
FIG. 3 is a schematic, end-elevational view of an example of the tooling fixture of FIG. 2.

The indexing point 106 is used to index the tilt platform 102 when the tooling fixture 100 is supporting a workpiece 202 (FIGS. 1-3). In other words, the tilt platform 102 is indexed by quickly and precisely moving the indexing point 106 from a start location (or position) to an index location (or position) relative to the reference frame 206. Rotational movement of the tilt platform 102, about two of the orthogonal axes 112 relative to the frame assembly 104, enables selective adjustment of an angular orientation of the tilt platform 102, while consistently, or constantly, maintaining a location of the indexing point 106 at the indexed location. In other words, adjustment of the angular orientation of the tilt platform 102, by rotating the tilt platform 102 about two of the orthogonal axes 112, does not change the location of the indexing point 106 in space. The frame assembly 104 is suitable positioned relative to the tilt platform 102 so that the tilt platform 102 is fully accessible by the workpiece 202 from a direction opposite to the frame assembly 104. In one or more examples, an entirety of the frame assembly 104 is located opposite to a work-support surface 108 (FIGS. 6-8) of the tilt platform 102, such as subjacent to the tilt platform 102. In other words, the frame assembly 104 does not block, or otherwise obstruct, access to the tilt platform 102 by the workpiece 202.

Figure 13:
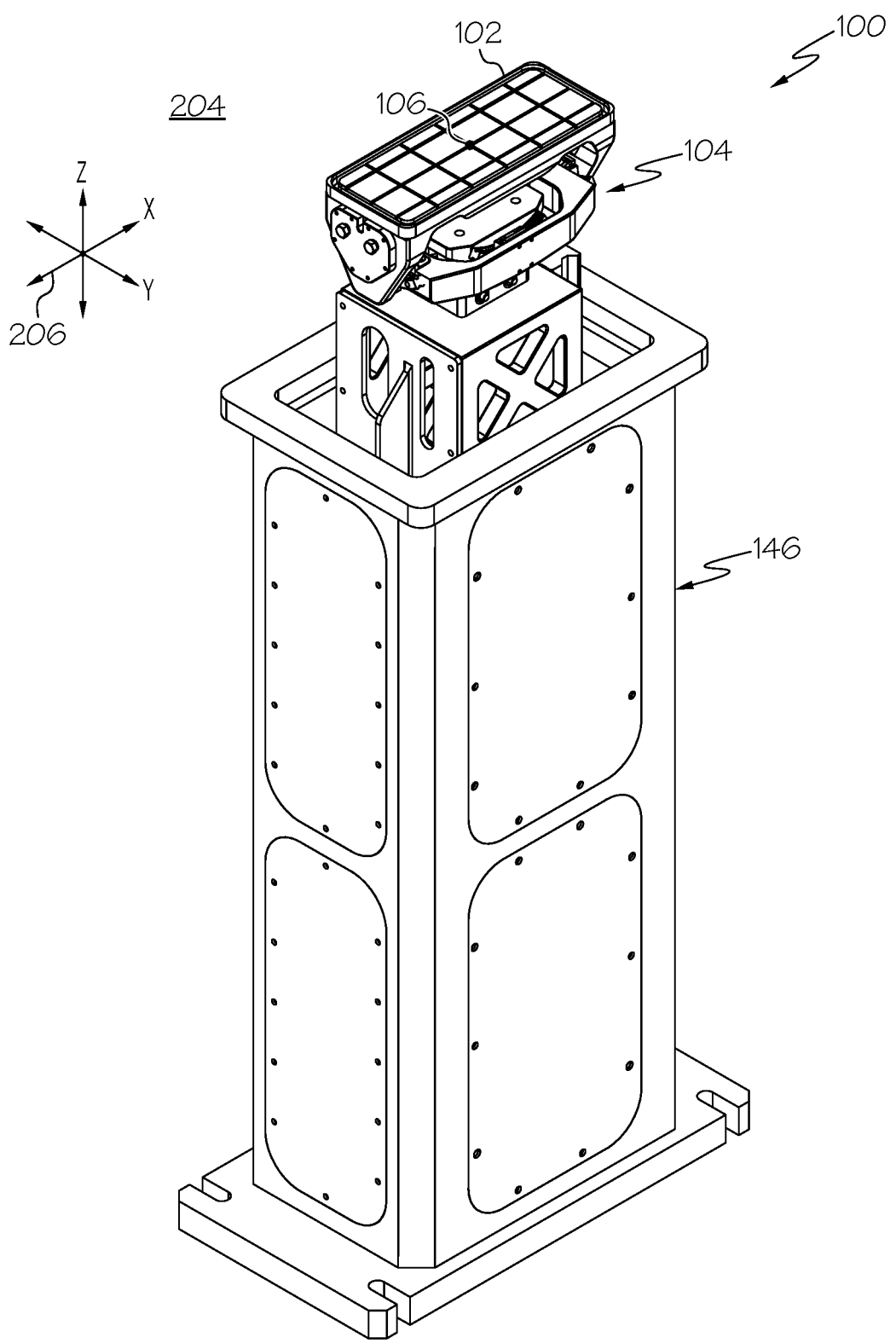
FIG. 13 is a schematic, perspective view of an example of the tooling fixture of FIG. 1.
Figure 14:
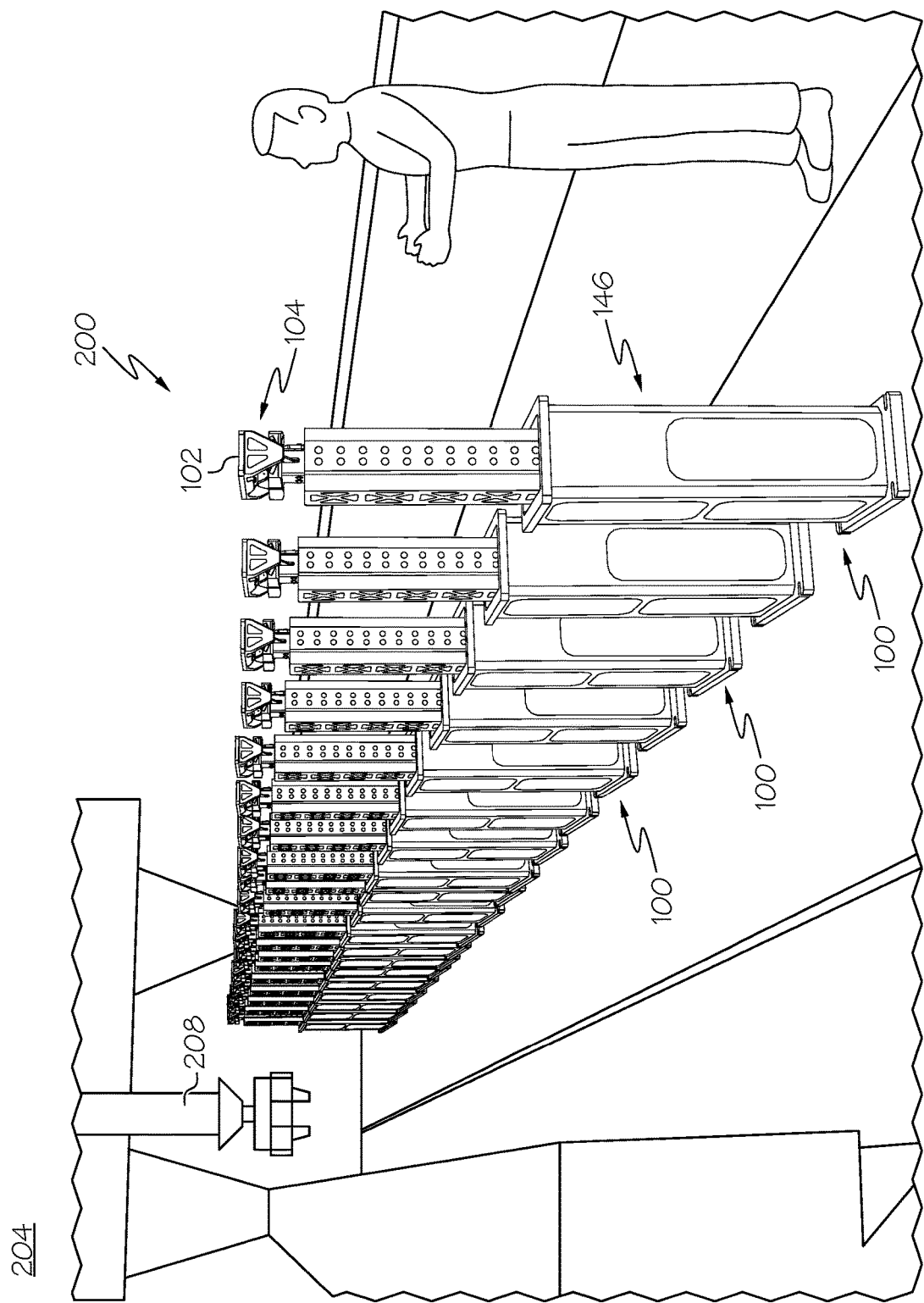
FIG. 14 is a schematic, perspective view of an example of the tooling system of FIG. 1.

As illustrated in FIGS. 2 and 3, the orthogonal axes 112 include a first orthogonal axis 114, a second orthogonal axis 116, and a third orthogonal axis 118. In an example, the orthogonal axes 112 of the tooling fixture 100 are fixed relative to the reference frame 206. The orthogonal axes 112 are used to define relative movement of the tooling fixture 100. In an example, the orthogonal axes 112 correspond to, or are defined relative to, the fixed reference frame 206 of a manufacturing environment 204 (FIGS. 13 and 14). In the illustrative examples, the first orthogonal axis 114 corresponds to (e.g., is parallel to) a Y-axis of the reference frame 206, the second orthogonal axis 116 corresponds to (e.g., is parallel to) an X-axis of the reference frame 206, and the third orthogonal axis 118 corresponds to (e.g., is parallel to) a Z-axis of the reference frame 206. The indexing point 106 of the tooling fixture 100 defines (or is defined by) an intersection of the first orthogonal axis 114, the second orthogonal axis 116, and the third orthogonal axis 118.

Referring generally to FIG. 1 and particularly to FIGS. 2 and 3, in an example, the frame assembly 104 includes a base frame 132. The frame assembly 104 includes a first moveable frame 134. The first moveable frame 134 is coupled to the base frame 132. The first moveable frame 134 is moveable along a first curved path 148 relative to the base frame 132. The first curved path 148 is depicted by broken lines in FIG. 2. The frame assembly 104 includes a second moveable frame 136. The second moveable frame 136 is coupled to the first moveable frame 134. The second moveable frame 136 is moveable along a second curved path 150 relative to the first moveable frame 134. The second curved path 150 is depicted by broken lines in FIG. 3. The tilt platform 102 is coupled to the second moveable frame 136.

As illustrated in FIGS. 2 and 3, in an example, the first curved path 148 is located on a first virtual plane (e.g., the XZ-plane in FIG. 2) and the second curved path 150 is located on a second virtual plane (e.g., the YZ-plane in FIG. 3). The first virtual plane containing the first curved path 148 and the second virtual plane containing the second curved path 150 are approximately perpendicular to each other.

The second moveable frame 136, the first moveable frame 134, and the base frame 132 are suitable positioned relative to the tilt platform 102 so that the work-support surface 108 (FIGS. 6-8) of the tilt platform 102 is fully accessible by the workpiece 202 (FIGS. 2 and 3) from a direction opposite to the frame assembly 104. In one or more examples, the second moveable frame 136, the first moveable frame 134, and the base frame 132 extend from the tilt platform 102 in a direction opposite the work-support surface 108 so that the tilt platform 102 is located superjacent to the second moveable frame 136, the first moveable frame 134, and the base frame 132.

As illustrated in FIG. 2, in an example, movement of the first moveable frame 134 along the first curved path 148 relative to the base frame 132 rotates the tilt platform 102 about the first orthogonal axis 114 of the orthogonal axes 112. As illustrated in FIG. 3, movement of the second moveable frame 136 along the second curved path 150 relative to the first moveable frame 134 rotates the tilt platform 102 about the second orthogonal axis 116 of the orthogonal axes 112.

As illustrated in FIGS. 2 and 3, the location of the indexing point 106 is, or remains, fixed relative to the reference frame 206 during movement of the first moveable frame 134 along the first curved path 148 and/or movement of the second moveable frame 136 along the second curved path 150 and, thus, during the resulting, respective rotational movement of the tilt platform 102 about the first orthogonal axis 114 and/or about the second orthogonal axis 116. The tilt platform 102 is indexed by locating the indexing point 106 at a desired, or selected, index location relative to the reference frame 206. Once the tilt platform 102 is indexed, the indexing point 106 remains fixed at the desired index location, regardless of the selected angular orientation of the tilt platform 102.

Figure 4:
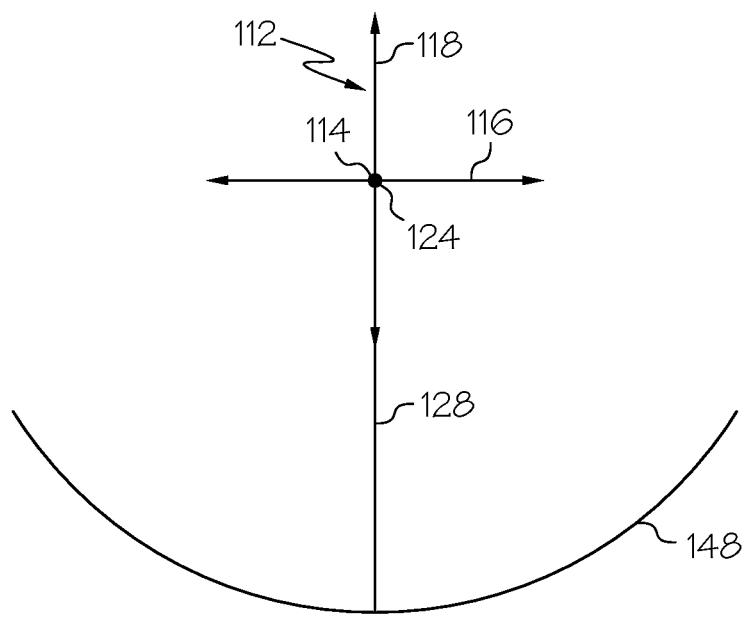
FIG. 4 is a schematic illustration of a first curved path of the tooling fixture of FIG. 1.
Figure 5:
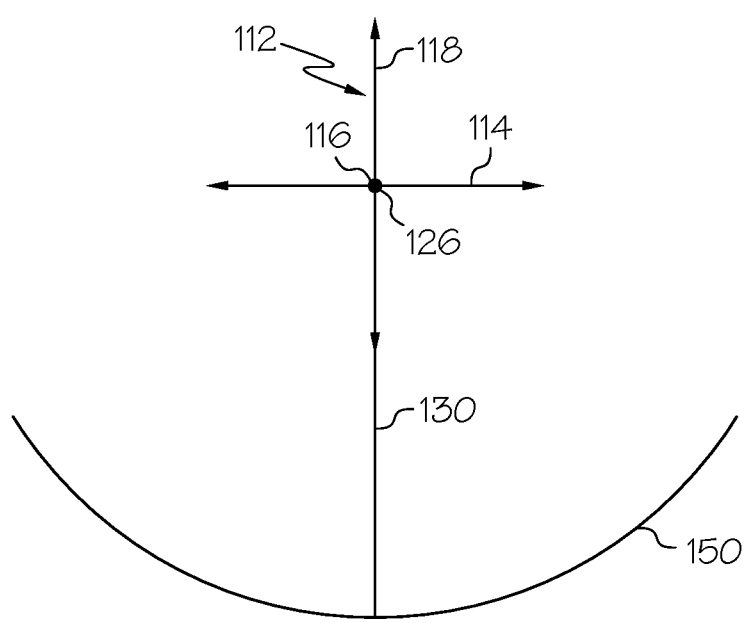
FIG. 5 is a schematic illustration of a second curved path of the tooling fixture of FIG. 1.
Figure 6:
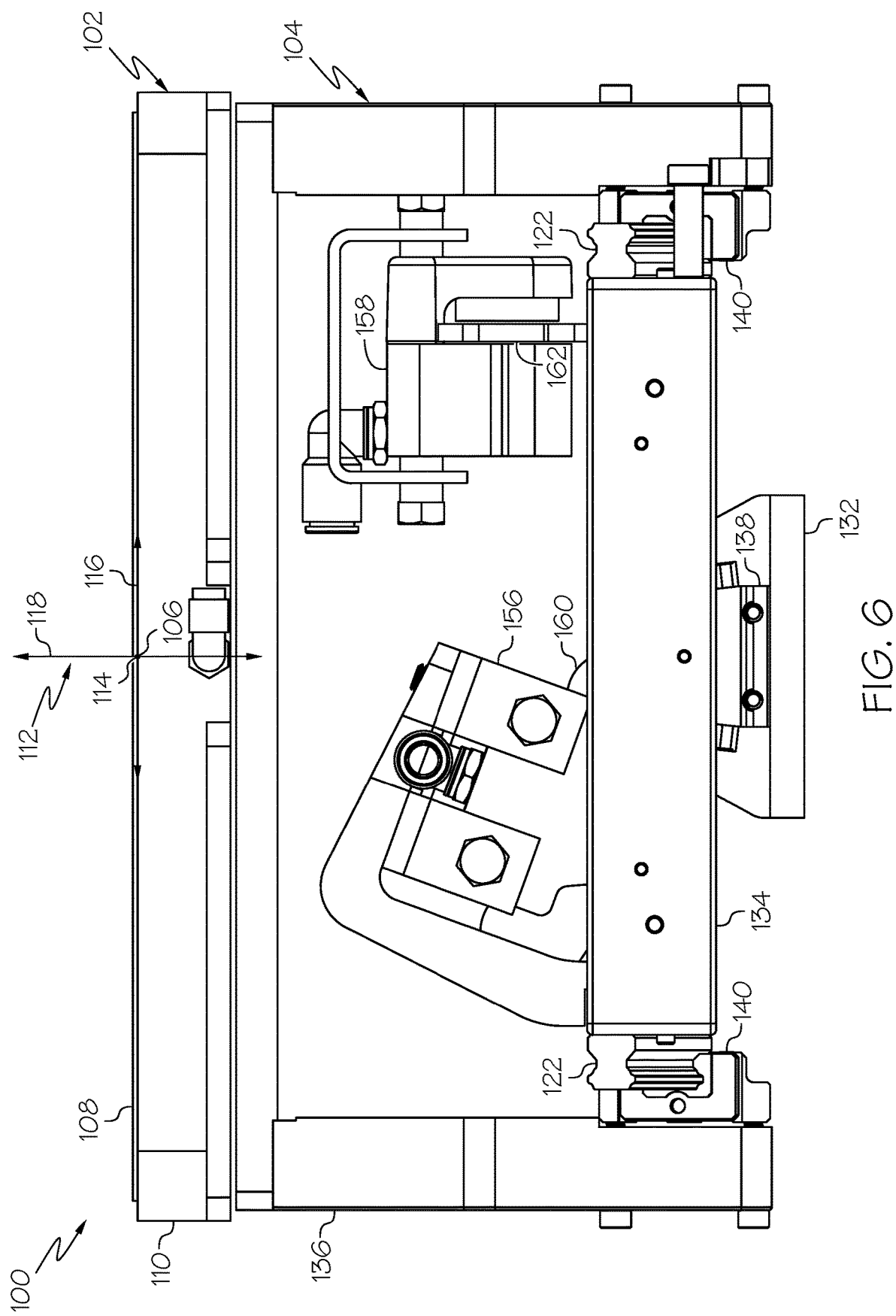
FIG. 6 is a schematic, side-elevational view of an example of a tooling fixture of FIG. 1.
Figure 7:
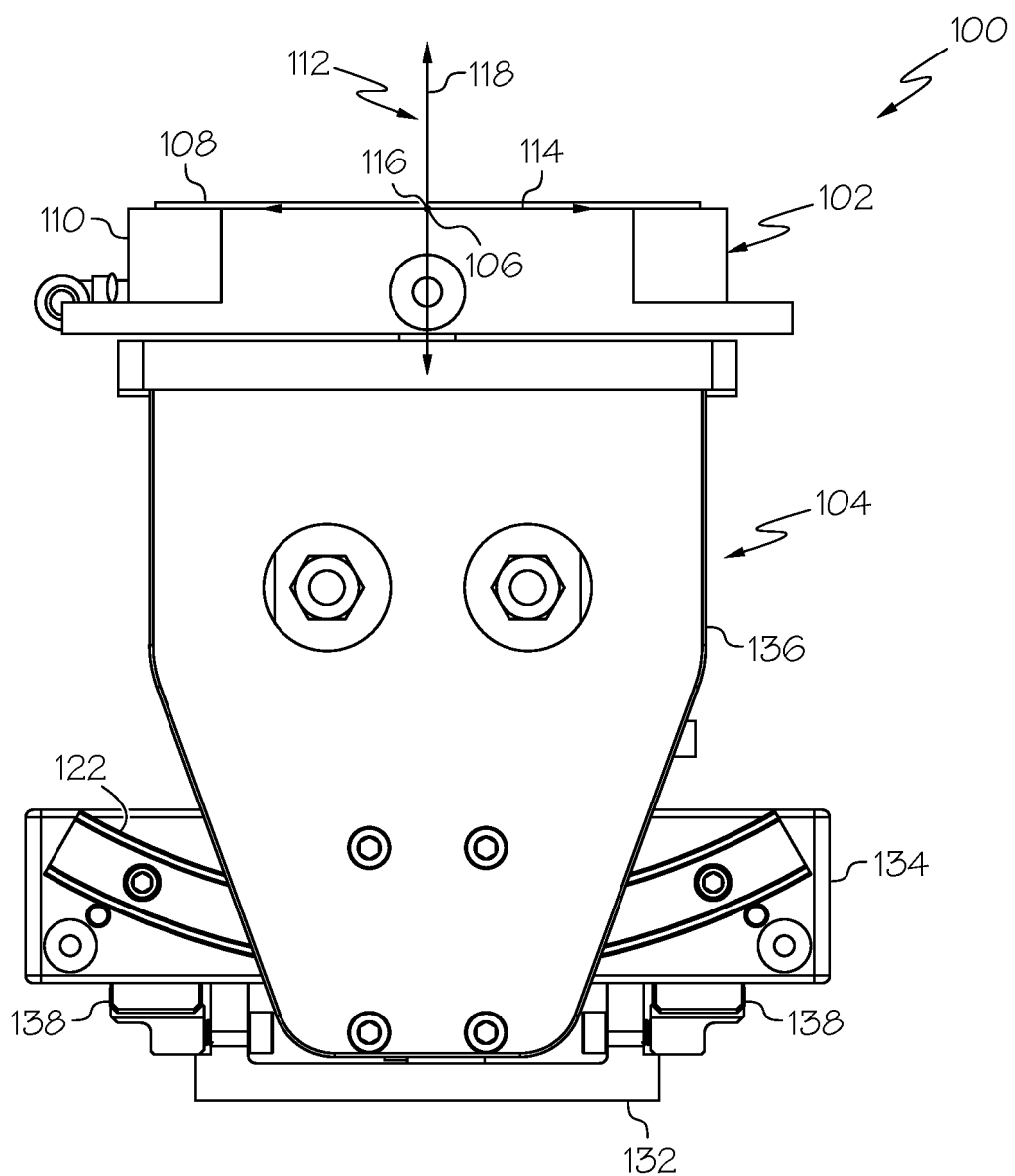
FIG. 7 is a schematic, end-elevational view of an example of the tooling fixture of FIG. 6.

As illustrated in FIG. 4, the first curved path 148 has a first center of curvature 124. As illustrated in FIG. 5, the second curved path 150 has a second center of curvature 126. In an example, the first center of curvature 124 is located on the first orthogonal axis 114 and the second center of curvature 126 is located on the second orthogonal axis 116. Therefore, in such an example, the first center of curvature 124 and the second center of curvature 126 are located on the same virtual plane (e.g., the XY-plane of the reference frame 206).

As illustrated in FIG. 4, the first curved path 148 has a first radius of curvature 128. As illustrated in FIG. 5, the second curved path 150 has a second radius of curvature 130. As used herein, the radius of curvature of a curve, such as in reference to the first curved path 148 and the second curved path 150, refers to the radius of a circular arc that best approximates the curve at a given point on the curve.

Referring generally to FIGS. 4 and 5, in an example, the first radius of curvature 128 of the first curved path 148 and the second radius of curvature 130 of the second curved path 150 are approximately same. In an example, such as in which the first radius of curvature 128 of the first curved path 148 and the second radius of curvature 130 of the second curved path 150 are equal and the first center of curvature 124 of the first curved path 148 and the second center of curvature 126 of the second curved path 150 are located on the same virtual plane (the XY-plane in FIGS. 2 and 3), the first curved path 148 and the second curved path 150 may be referred to as being aligned with each other, for example, such that corresponding points along each curved path are approximately located in the same virtual plane (e.g., XY-planes at different Z-locations in FIGS. 2 and 3). As used herein, the term "aligned," in reference to two or more curved items being aligned with each other, generally refers to a condition in which the radiuses of curvature of the two curved items are equal and the centers of curvature of the two curved items are located on the same axis or on the same virtual plane. Illustrative examples of the disclosed tooling fixture 100 in which the first curved path 148 and the second curved path 150 are aligned with each other are depicted in FIGS. 2, 3, and 6-11.

As used herein, the term "approximately" refers to or represents a condition that is close to, but not exactly, the stated condition that still performs the desired function or achieves the desired result. In an example, the term "approximately" refers to a condition that is within an acceptable predetermined tolerance or accuracy. In an example, the term "approximately" refers to a condition that is within 10% of the stated condition. However, the term "approximately" does not exclude a condition that is exactly the stated condition. Accordingly, the term "approximately" may be interpreted to mean exactly to or within a desired degree of accuracy.

Figure 12:
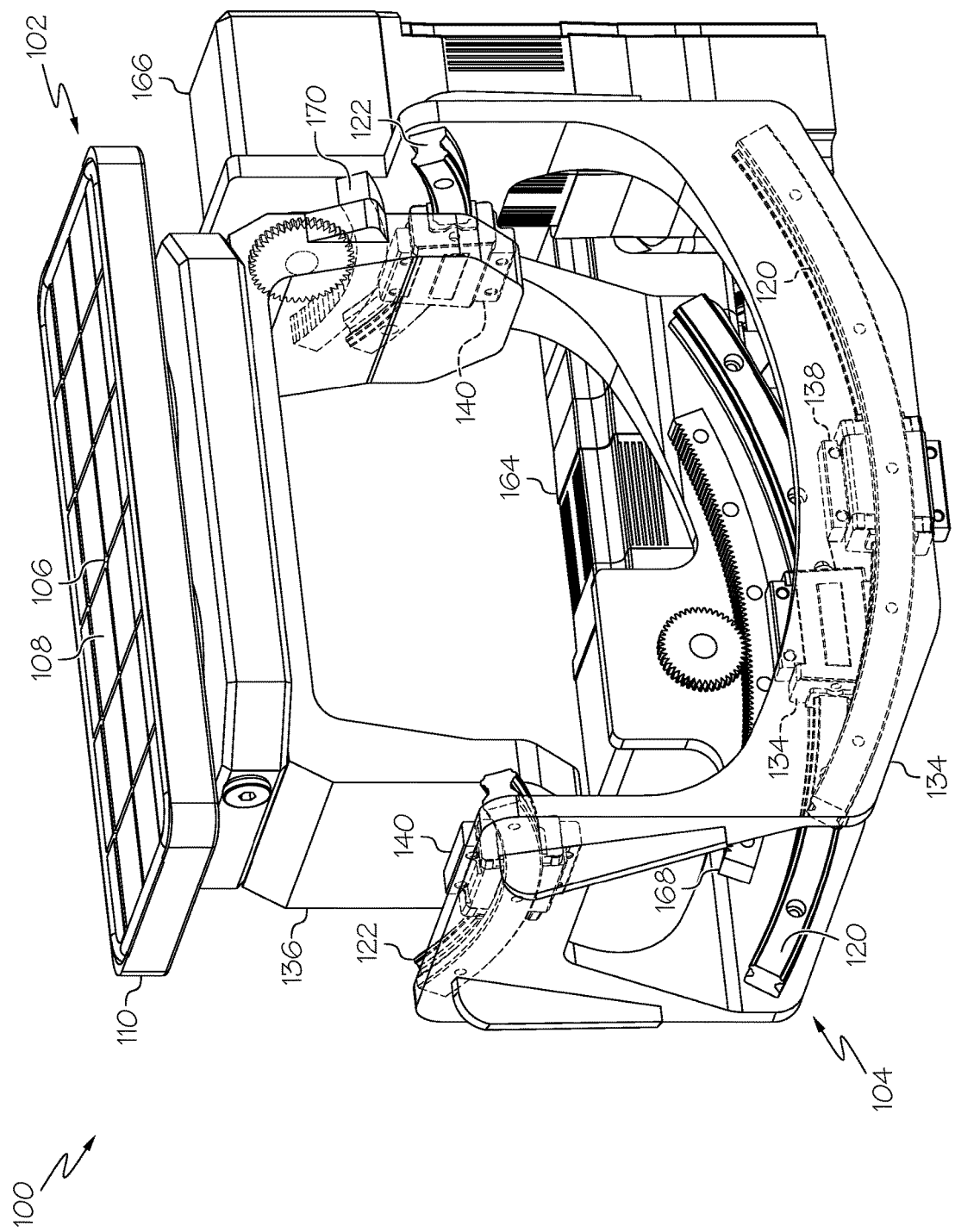
FIG. 12 is a schematic, perspective view of an example of the tooling fixture of FIG. 1.

Referring generally to FIGS. 4 and 5, in another example, the first radius of curvature 128 of the first curved path 148 and the second radius of curvature 130 of the second curved path 150 are different. In examples in which the first radius of curvature 128 of the first curved path 148 and the second radius of curvature 130 of the second curved path 150 are not equal and the first center of curvature 124 of the first curved path 148 and the second center of curvature 126 of the second curved path 150 are located on the same virtual plane (the XY-plane in FIGS. 2 and 3), the first curved path 148 and the second curved path 150 may be referred to as being offset from each other, for example, such that corresponding points along each curved path are located in different virtual planes (e.g., XY-planes at different Z-locations in FIGS. 2 and 3). In other words, in such an example, the first curved path 148 and the second curved path 150 are not aligned with each other, but are rather linearly displaced relative to each other. As used herein, the term "offset," in reference to two or more curved items being offset from each other, refers to a condition in which the radiuses of curvature of the two curved items are not equal and the centers of curvature of the two curved items are located on the same axis or the same virtual plane. An illustrative example of the disclosed tooling fixture 100 in which the first curved path 148 and the second curved path 150 are offset is depicted in FIG. 12.

Referring generally to FIG. 1 and particularly to FIGS. 2, 3, and 6-12, the tilt platform 102 includes, or takes the form of, any one of various structural members suitable to support the workpiece 202, such as during a manufacturing operation. The frame assembly 104 (e.g., the base frame 132, the first moveable frame 134, and the second moveable frame 136) includes, or takes the form of, any one of various structural members suitable to support the tilt platform 102 and enable rotational movement of the tilt platform 102 about two of the orthogonal axes 112 (e.g., the first orthogonal axis 114 and the second orthogonal axis 116).

In the illustrative examples, rotation of the tilt platform 102 about the first orthogonal axis 114 enables adjustment of the angular orientation of the tilt platform 102 relative to the reference frame 206 (e.g., about the Y-axis), also referred to as pitch. In the illustrative examples, rotation of the tilt platform 102 about the second orthogonal axis 116 enables adjustment of the angular orientation of the tilt platform 102 relative to the reference frame 206 (e.g., about the X-axis), also referred to as roll.

Referring generally to FIG. 1, the frame assembly 104 includes any one of various types of relative-movement mechanisms configured to enable relative movement of the first moveable frame 134 and the second moveable frame 136. In an example, the frame assembly 104 includes a first relative-movement mechanism 152. The first relative-movement mechanism 152 is coupled to, or forms a portion of, the base frame 132 and the first moveable frame 134. The first relative-movement mechanism 152 is configured to enable movement of the first moveable frame 134 along the first curved path 148 relative to the base frame 132. In an example, the frame assembly 104 includes a second relative-movement mechanism 154. The second relative-movement mechanism 154 is coupled to, or forms a portion of, the first moveable frame 134 and the second moveable frame 136. The second relative-movement mechanism 154 is configured to enable movement of the second moveable frame 136 along the second curved path 150 relative to the first moveable frame 134.

Each one of the first relative-movement mechanism 152 and the second relative-movement mechanism 154 includes, or takes the form of, any one of various mechanisms suitable to provide repeatable, precise, and controllable movement along a curved travel path.

Referring to FIGS. 6-13, in an example, the frame assembly 104 includes at least one first curved rail 120. The first curved rail 120 is configured to support movement of the first moveable frame 134 along the first curved path 148 (FIGS. 2 and 4) relative to the base frame 132. The frame assembly 104 includes at least one second curved rail 122. The second curved rail 122 is configured to support movement of the second moveable frame 136 along the second curved path 150 (FIGS. 3 and 5) relative to the first moveable frame 134.

In an example, movement of the first moveable frame 134 along the first curved rail 120 relative to the base frame 132 rotates the tilt platform 102 about the first orthogonal axis 114 of the orthogonal axes 112. In an example, movement of the second moveable frame 136 along the second curved rail 122 relative to the first moveable frame 134 rotates the tilt platform 102 about the second orthogonal axis 116 of the orthogonal axes 112

In the illustrative examples in which the first orthogonal axis 114 corresponds to the Y-axis and the second orthogonal axis 116 corresponds to the X-axis, the first curved rail 120 may be referred to as a Y-rotation rail and the second curved rail 122 may be referred to as an X-rotation rail. However, in other examples, the first orthogonal axis 114 may correspond to the X-axis and the second orthogonal axis 116 may correspond to the Y-axis. In such examples, the first curved rail 120 may be referred to as the X-rotation rail and the second curved rail 122 may be referred to as the Y-rotation rail.

In one or more examples, the frame assembly 104 has any number of first curved rails 120 and/or the second curved rails 122. In an example, the frame assembly 104 includes one first curved rail 120 and one second curved rail 122. In another example, the frame assembly 104 includes a plurality of first curved rails 120 and/or a plurality of second curved rails 122. In such an example, as illustrated in FIGS. 6-13, the frame assembly 104 includes an opposed pair of first curved rails 120 and an opposed pair of second curved rails 122.

Generally, the first curved rail 120, or the plurality of first curved rails 120, defines the first curved path 148. The second curved rail 122, or the plurality of second curved rails 122, defines the second curved path 150. Accordingly, the first curved rail 120, or each one of the first curved rails 120, has the first center of curvature 124 (FIG. 4), located on the first orthogonal axis 114, and the first radius of curvature 128 (FIG. 4). Similarly, the second curved rail 122, or each one of the second curved rails 122, has the second center of curvature 126 (FIG. 5), located on the second orthogonal axis 116, and the second radius of curvature 130 (FIG. 5). The first center of curvature 124 of the first curved rail 120 and the second center of curvature 126 of the second curved rail 122 are located on the same virtual plane (e.g., the XY-plane of the reference frame 206).

Referring to FIGS. 6-12, in one or more examples, such as in which the frame assembly 104 includes the opposed pair of first curved rails 120 and the opposed pair of second curved rail 122, the first center of curvature 124 of each one of the first curved rails 120 is located on the first orthogonal axis 114. The second center of curvature 126 of each one of the second curved rails 122 is located on the second orthogonal axis 116. The first radius of curvature 128 (FIG. 4) of each one of the first curved rails 120 is approximately the same. The second radius of curvature 130 (FIG. 5) of each one of the second curved rails 122 is approximately the same. In other words, the first curved rails 120 may be referred to as being aligned to each other and the second curved rails 122 may be referred to as being aligned to each other.

Referring to FIGS. 6-11, in one or more examples, the first center of curvature 124 (FIG. 4) of the first curved rails 120 and the second center of curvature 126 (FIG. 5) of the second curved rails 122 are located on the same virtual plane. The first radius of curvature 128 (FIG. 4) of the first curved rails 120 and the second radius of curvature 130 (FIG. 5) of the second curved rails 122 are approximately equal. In other words, the first curved rails 120 and the second curved rails 122 may be referred to as being aligned with each other.

Referring to FIG. 12, in one or more examples, the first center of curvature 124 (FIG. 4) of the first curved rails 120 and the second center of curvature 126 (FIG. 5) of the second curved rails 122 are located on the same virtual plane. The first radius of curvature 128 (FIG. 4) of the first curved rails 120 and the second radius of curvature 130 (FIG. 5) of the second curved rails 122 are different. In other words, the first curved rails 120 and the second curved rails 122 may be referred to as being offset from each other.

Referring to FIGS. 6-12, in one or more examples, the frame assembly 104 includes at least one first carriage 138.

The first carriage 138 corresponds to and is associated with the first curved rail 120. The first carriage 138 is operably coupled with the first curved rail 120 and rides along the first curved rail 120 following the first curved path 148 (FIGS. 2 and 4). In an example, the first curved rail 120 provides a running surface for bearings of the first carriage 138.

In an example, the frame assembly 104 includes at least one second carriage 140. The second carriage 140 corresponds to and is associated with the second curved rail 122. The second carriage 140 is operably coupled with the second curved rail 122 and rides along the second curved rail 122 following the second curved path 150 (FIGS. 3 and 5). In an example, the second curved rail 122 provides a running surface for bearings of the second carriage 140.

Referring generally to FIGS. 6-12, in one or more examples, the frame assembly 104 has any one of various different configurations of the first curved rail 120 and the first carriage 138 and any one of various different configurations of the second curved rail 122 and the second carriage 140. In an example, the first curved rail 120 is coupled to one of the base frame 132 or the first moveable frame 134 and the first carriage 138 is coupled to an opposing one of the base frame 132 or the first moveable frame 134. The second curved rail 122 is coupled to one of the first moveable frame 134 or the second moveable frame 136 and the second carriage 140 is coupled to an opposing one of the first moveable frame 134 or the second moveable frame 136.

In an example, the first curved rails 120 and the second curved rails 122 are coupled to the first moveable frame 134. The first carriages 138 are coupled to the base frame 132. The first carriages 138 remain fixed and the first curved rails 120 move through the first carriages 138 during movement of the first moveable frame 134 along the first curved path 148 (FIGS. 2 and 4) relative to the base frame 132. The second carriages 140 are coupled to the second moveable frame 136. The second carriages 140 move along the second curved rails 122 during movement of the second moveable frame 136 along the second curved path 150 (FIGS. 3 and 5) relative to the first moveable frame 134.

In one or more other examples, the frame assembly 104 has a different structural arrangement. In an example, the first curved rails 120 are coupled to the base frame 132 and the second curved rails 122 are coupled to the second moveable frame 136. The first carriages 138 and the second carriages 140 are coupled to the first moveable frame 134. The first carriages 138 move along the first curved rails 120 during movement of the first moveable frame 134 along the first curved path 148 (FIGS. 2 and 4) relative to the base frame 132. The second curved rails 122 move through the second carriages 140 during movement of the second moveable frame 136 along the second curved path 150 (FIGS. 3 and 5) relative to the first moveable frame 134. Other arrangements and/or configurations of the first curved rail 120, the first carriage 138, the second curved rail 122, and the second carriage 140 are also contemplated.

The structural and operational combination of the first curved rail 120 and the first carriage 138 is an example of the first relative-movement mechanism 152 (FIGS. 1-3). The structural and operational combination of the second curved rail 122 and the second carriage 140 is an example of the second relative-movement mechanism 154 (FIGS. 1-3).

The first relative-movement mechanism 152 and/or the second relative-movement mechanism 154 of the frame assembly 104 may have any one of various other structural arrangements and/or operational configurations.

Although not explicitly illustrated, in an example, the frame assembly 104 includes at least one first curved slot, for example, formed in one of the base frame 132 or the first moveable frame 134. The first curved slot defines the first curved path 148 (FIGS. 2 and 4). The first curved slot is configured to support movement of the first moveable frame 134 along the first curved path 148 relative to the base frame 132. The frame assembly 104 includes at least one first roller, for example, coupled to an opposite one of the base frame 132 or the first moveable frame 134. The first roller corresponds to and is associated with the first curved slot. The first roller is operably coupled with the first curved slot and rides within the first curved slot following the first curved path 148. Similarly, the frame assembly 104 includes at least one second curved slot, for example, formed in one of the first moveable frame 134 or the second moveable frame 136. The second curved slot defines the second curved path 150 (FIGS. 3 and 5). The second curved slot is configured to support movement of the second moveable frame 136 along the second curved path 150 relative to the first moveable frame 134. The frame assembly 104 includes at least one second roller, for example, coupled to an opposite one of the first moveable frame 134 or the second moveable frame 136. The second roller corresponds to and is associated with the second curved slot. The second roller is operably coupled with the second curved slot and rides within the second slot following the second curved path 150.

The structural and operational combination of the first curved slot and the first roller is another example of the first relative-movement mechanism 152 (FIGS. 1-3). The structural and operational combination of the second curved slot and the second roller is an example of the second relative-movement mechanism 154 (FIGS. 1-4).

Although not explicitly illustrated, in an example, the frame assembly 104 includes at least one first curved track, for example, coupled to one of the base frame 132 or the first moveable frame 134. The first curved track defines the first curved path 148 (FIGS. 2 and 4). The first curved track is configured to support movement of the first moveable frame 134 along the first curved path 148 relative to the base frame 132. The frame assembly 104 includes at least one first bearing, for example, coupled to an opposite one of the base frame 132 or the first moveable frame 134. The first bearing corresponds to and is associated with the first curved track. The first bearing is operably coupled with the first curved track and rides within the first curved track following the first curved path 148. Similarly, the frame assembly 104 includes at least one second curved track, for example, coupled to one of the first moveable frame 134 or the second moveable frame 136. The second curved track defines the second curved path 150 (FIGS. 3 and 5). The second curved track is configured to support movement of the second moveable frame 136 along the second curved path 150 relative to the first moveable frame 134. The frame assembly 104 includes at least one second bearing, for example, coupled to an opposite one of the first moveable frame 134 or the second moveable frame 136. The second bearing corresponds to and is associated with the second curved track. The second roller is operably coupled with the second curved track and rides within the second curved track following the second curved path 150.

The structural and operational combination of the first curved track and the first bearing is another example of the first relative-movement mechanism 152 (FIGS. 1-3). The structural and operational combination of the second curved track and the second bearing is an example of the second relative-movement mechanism 154 (FIGS. 1-4).

Other operational configurations and/or structural arrangements of the first relative-movement mechanism 152 and the second relative-movement mechanism 154 are also contemplated.

Regardless of the structural arrangement and operational configuration of the frame assembly 104 and/or the type or arrangement of the first relative-movement mechanism 152 and the second relative-movement mechanism 154, during movement of the first moveable frame 134 along the first curved path 148, the first moveable frame 134 partially revolves around the first orthogonal axis 114, or the indexing point 106. Similarly, during movement of the second moveable frame 136 along the second curved path 150, the second moveable frame 136 partially revolves around the second orthogonal axis 116, or the indexing point 106.

Referring to FIGS. 6-13, in an example, the tilt platform 102 includes a plate member 110 having, or forming, the work-support surface 108. The work-support surface 108 is configured to engage a portion of the workpiece 202 (FIGS. 2 and 3). In an example, the indexing point 106 is located on the work-support surface 108. Rotational movement of the tilt platform 102 about either one of the first orthogonal axis 114 and/or the second orthogonal axis 116 positions, or angularly orients, the work-support surface 108 to complement a position, or angular orientation, of a portion of the workpiece 202 supported by the tooling fixture 100.

The tilt platform 102 is coupled to the frame assembly 104 (e.g., the second moveable frame 136) so that the frame assembly 104 is located opposite the work-support surface 108. Such a configuration facilitates the work-support surface 108 being fully accessible by the workpiece 202 from a direction opposing the frame assembly 104. In other words, the frame assembly 104 does not block, or otherwise obstruct, the work-support surface 108.

In an example, the work-support surface 108 is substantially planar to make contact with and support a planar portion of the workpiece 202. In another example, the work-support surface 108 has a contour along at least one axis to make contact with and support a contoured portion of the workpiece 202.

In an example, the tilt platform 102 is removably coupled to the frame assembly 104. Removably coupling the tilt platform 102 to the frame assembly 104 enables different types, sizes, shapes, and/or configurations of the tilt platform 102 to be quickly and easily interchanged depending upon the particular workpiece 202 being supported by the tooling fixture 100.

In an example, the tilt platform 102 is configured to hold or otherwise secure the workpiece 202 in place on the work-support surface 108. In an example, the plate member 110 of the tilt platform 102 is a vacuum plate that is configured to apply an active vacuum to the workpiece 202 to hold the workpiece 202 in place. In another example, the plate member 110 of the tilt platform 102 takes the form of a magnet or is made of a ferromagnetic material and the tooling fixture 100 includes a magnetic clamp member, such as a secondary magnet or ferromagnetic member. The magnetic clamp member is placed in contact with the workpiece 202 opposite to the plate member 110 so that the workpiece 202 is magnetically clamped between the plate member 110 and the magnetic clamp member to hold the workpiece 202 in place. In another example, the tooling fixture 100 includes a mechanical clamp that engages the tilt platform 102 and the workpiece 202 to hold the workpiece 202 in place. In another example, the tilt platform 102 and the workpiece 202 each includes a locating hole and an index pin is secured through aligned locating holes of the tilt platform 102 and the workpiece 202 to hold the workpiece 202 in place. Other holding mechanisms are also contemplated. Additionally, in one or more examples, the holding mechanism is configured to center the workpiece 202 on the tilt platform 102.

Referring generally to FIG. 1, in an example, the tooling fixture 100 includes a brake assembly 142. The brake assembly 142 is operatively coupled with the frame assembly 104 and is configured to inhibit rotational movement of the tilt platform 102 about at least one of the orthogonal axes 112. In an example, the brake assembly 142 is configured to inhibit movement of the first moveable frame 134 along the first curved path 148 (FIGS. 2 and 4) relative to the base frame 132. In an example, the brake assembly 142 is configured to inhibit movement of the second moveable frame 136 along the second curved path 150 (FIGS. 3 and 5) relative to the first moveable frame 134.

Referring to FIGS. 6-11, in an example, the brake assembly 142 (FIG. 1) includes at least one first brake 156. The first brake 156 is configured to prevent movement of the first moveable frame 134 along the first curved path 148 and, thus, prevent rotational movement of the tilt platform 102 about the first orthogonal axis 114 and lock the tilt platform 102 at a desired, or selected, angular orientation. In an example, the brake assembly 142 includes at least one second brake 158. The second brake 158 is configured to prevent movement of the second moveable frame 136 along the second curved path 150 and, thus, prevent rotational movement of the tilt platform 102 about the second orthogonal axis 116 and lock the tilt platform 102 at a desired, or selected, angular orientation.

In one or more examples, the first brake 156 is coupled to one of the base frame 132 or the first moveable frame 134 and is configured to selectively engage an opposite one of the base frame 132 or the first moveable frame 134 to lock movement of the first moveable frame 134 along the first curved path 148 relative to the base frame 132. In one or more examples, the second brake 158 is coupled to one of the first moveable frame 134 or the second moveable frame 136 and is configured to selectively engage an opposite one of the first moveable frame 134 or the second moveable frame 136 to lock movement of the second moveable frame 136 along the second curved path 150 relative to the first moveable frame 134. In one or more examples, the first brake 156 and/or the second brake 158 have any one of various configurations.

Figure 8:
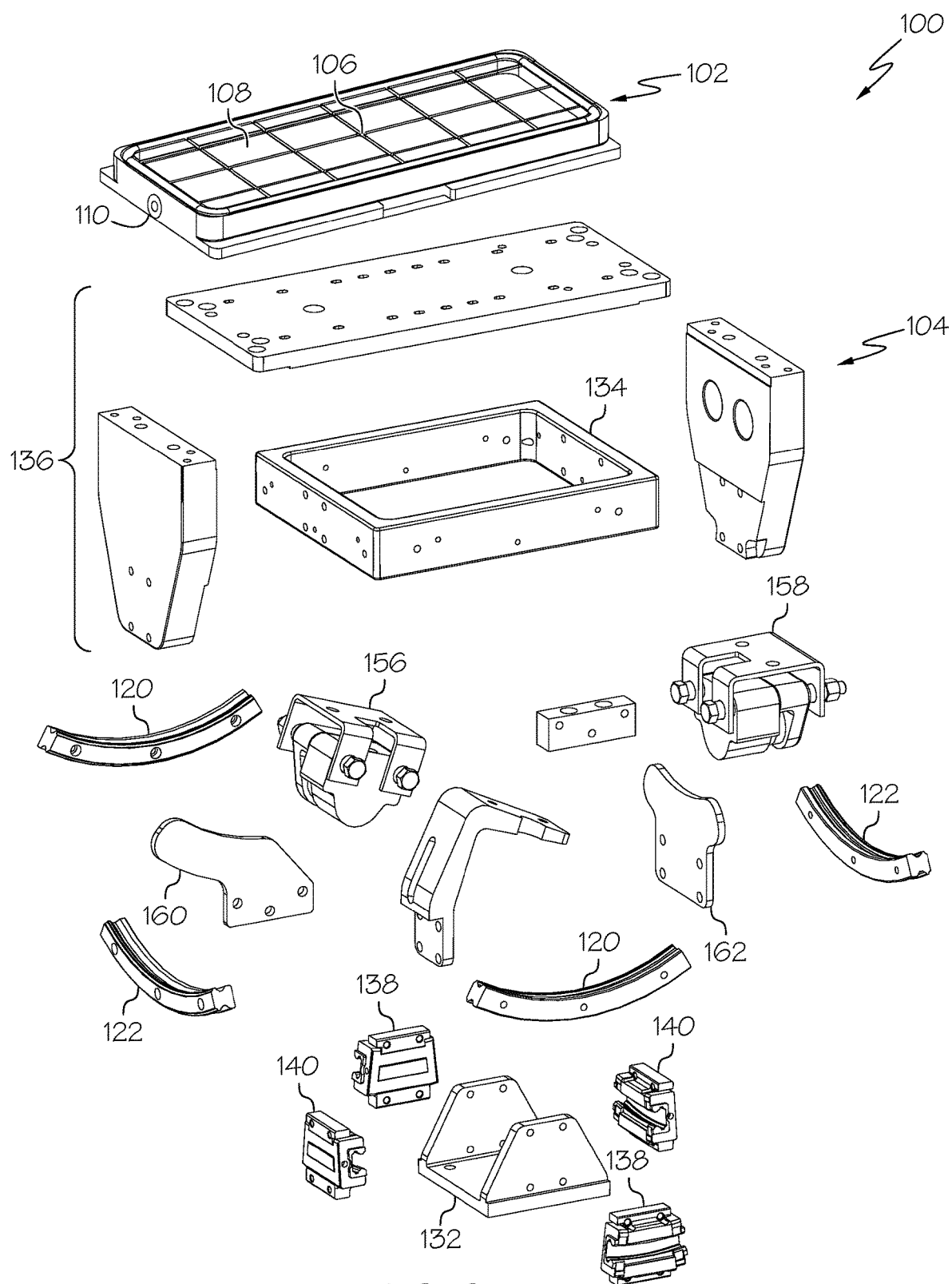
FIG. 8 is a schematic, perspective, exploded view of the tooling fixture of FIG. 6.
Figure 9:
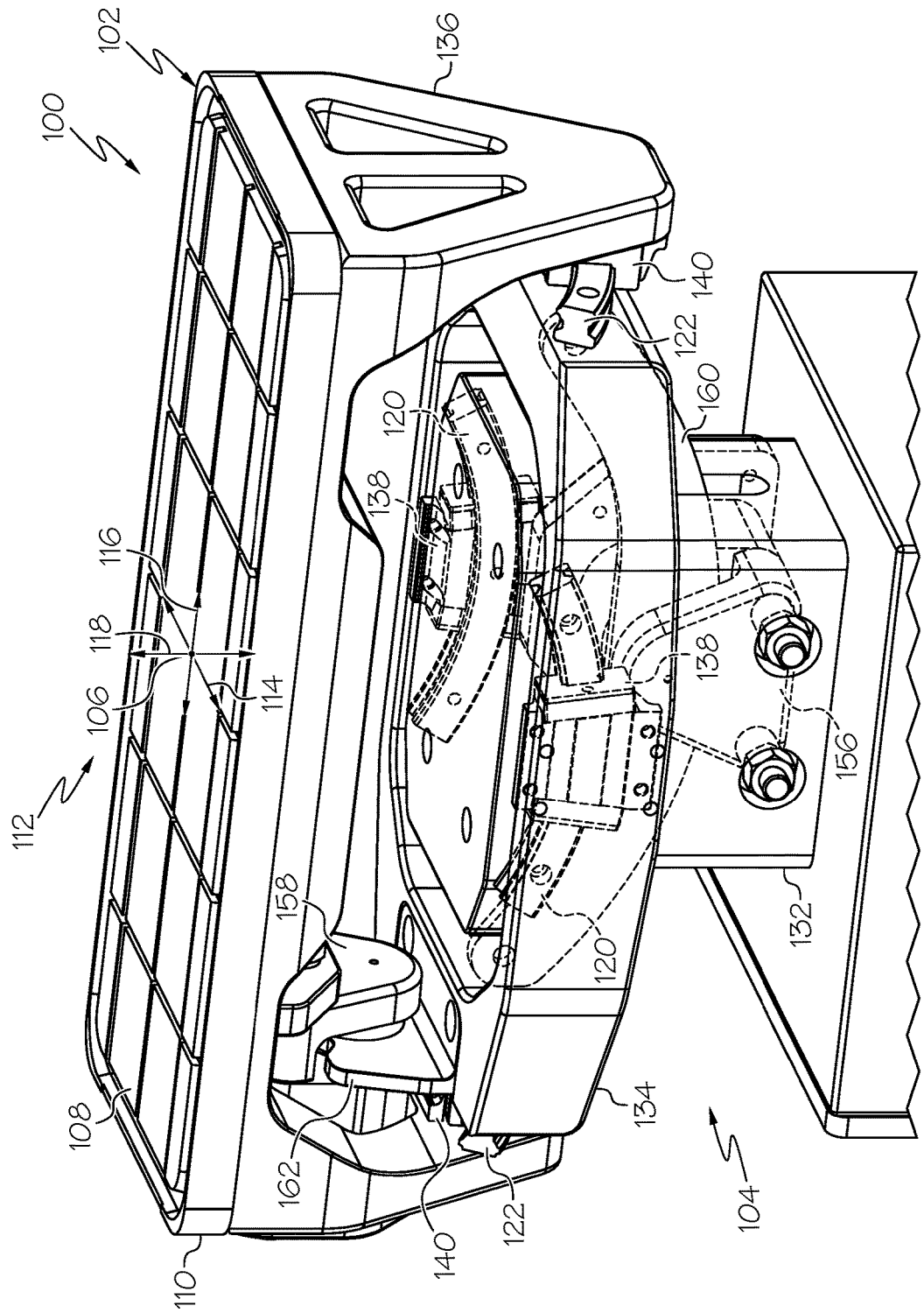
FIG. 9 is a schematic, perspective view of an example of the tooling fixture of FIG. 1.
Figure 10:
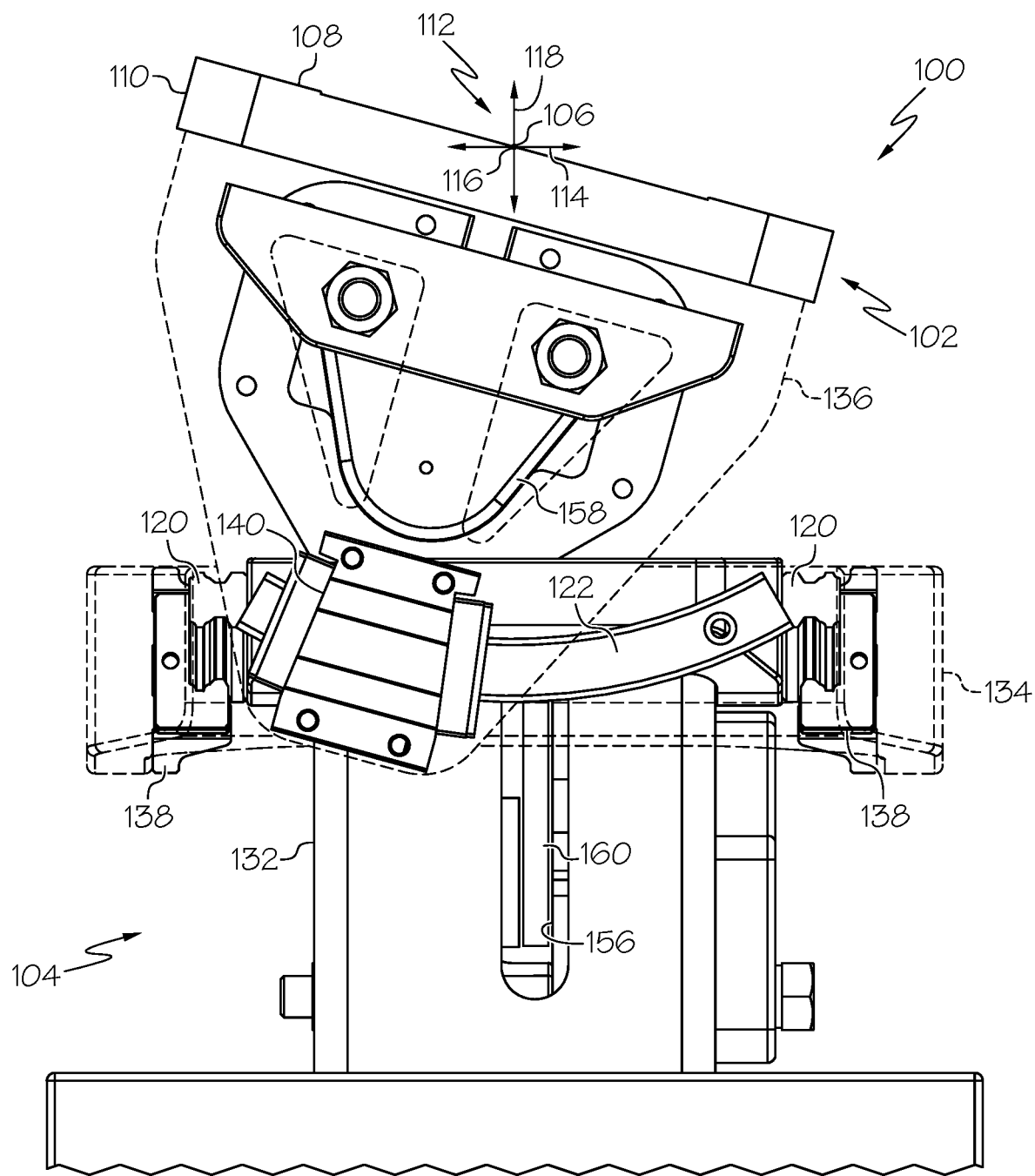
FIG. 10 is a schematic, end-elevational view of an example of the tooling fixture of FIG. 9.
Figure 11:
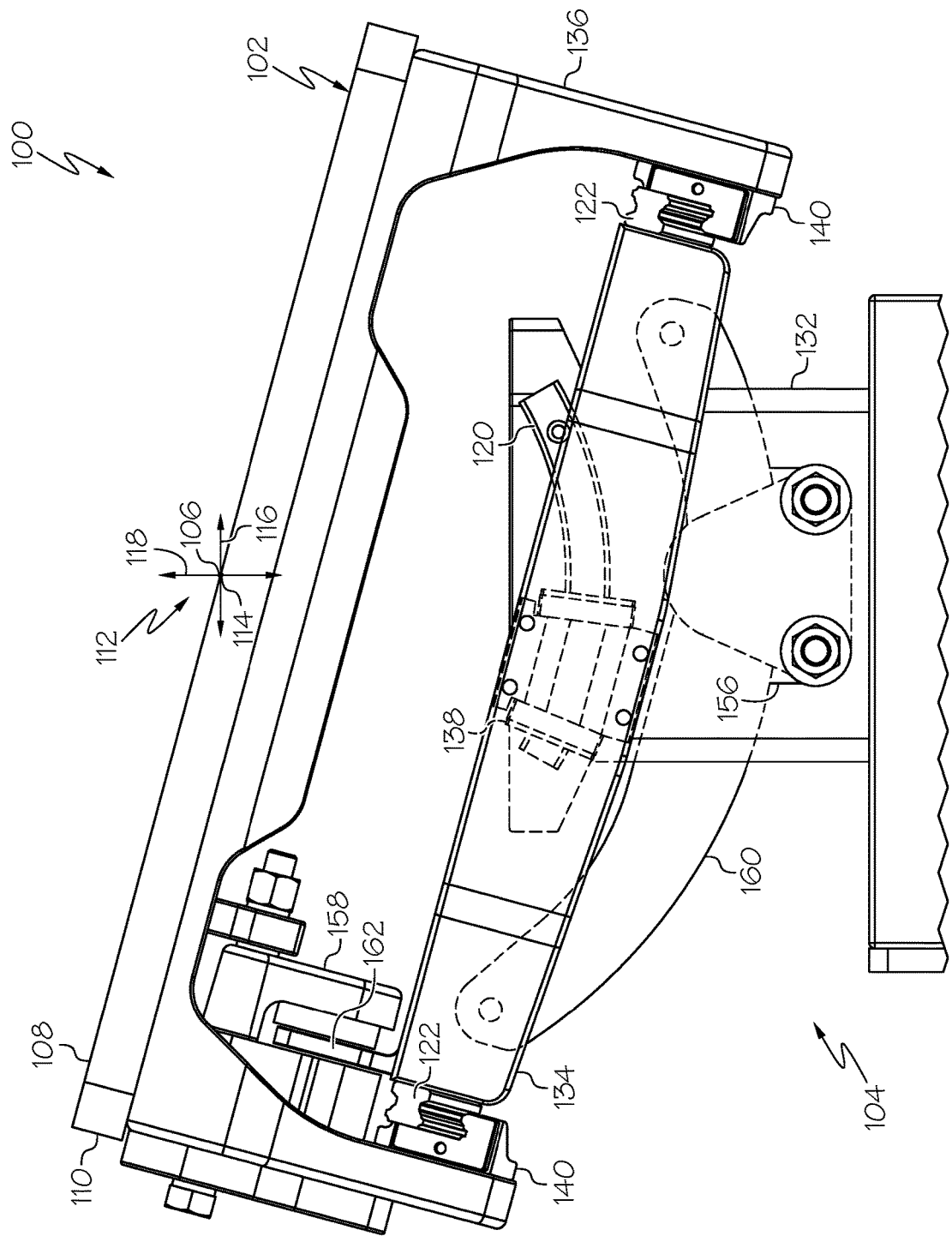
FIG. 11 is a schematic, side-elevational view of an example of a tooling fixture of FIG. 9.

Referring generally to FIGS. 6, 7, and 9-11 and particularly to FIG. 8, in an example, the first brake 156 includes, or takes the form of, a first brake caliper, such as a pneumatic or hydraulic brake caliper. The first brake 156 is coupled to the first moveable frame 134. The frame assembly 104 includes a first brake plate 160. The first brake plate 160 is coupled to the base frame 132. The first brake caliper of the first brake 156 fits over the first brake plate 160. Upon actuation of the first brake 156, the first brake caliper engages and clamps down on the first brake plate 160 to halt movement of the first moveable frame 134 relative to the base frame 132.

Referring generally to FIGS. 6, 7, and 9-11 and particularly to FIG. 8, in an example, the second brake 158 includes, or takes the form of, a second brake caliper, such as a pneumatic or hydraulic brake caliper. The second brake 158 is coupled to the second moveable frame 136. The frame assembly 104 includes a second brake plate 162. The second brake plate 162 is coupled to the first moveable frame 134. The second brake caliper of the second brake 158 fits over the second brake plate 162. Upon actuation of the second brake 158, the second brake caliper engages and clamps down on the second brake plate 162 to halt movement of the second moveable frame 136 relative to the first moveable frame 134.

Other operational configurations and/or structural arrangements of the first brake 156 and the second brake 158 are also contemplated.

Referring generally to FIG. 1, in an example, the tooling fixture 100 includes a rotation-drive assembly 144. The rotation-drive assembly 144 is operatively coupled with the frame assembly 104 and is configured to rotationally move the tilt platform 102 about at least one of the orthogonal axes 112. In an example, the rotation-drive assembly 144 is configured to drive movement of the first moveable frame 134 along the first curved path 148 (FIGS. 2 and 4) relative to the base frame 132. In an example, the rotation-drive assembly 144 is configured to drive movement of the second moveable frame 136 along the second curved path 150 (FIGS. 3 and 5) relative to the first moveable frame 134.

Referring to FIG. 12, in an example, the rotation-drive assembly 144 (FIG. 1) includes at least one first drive-actuator 164 and at least one first power-transmitting component 168. The first drive-actuator 164 and the first power-transmitting component 168 are configured to drive movement of the first moveable frame 134 along the first curved path 148 and, thus, drive rotational movement of the tilt platform 102 about the first orthogonal axis 114 and selectively orient the tilt platform 102 at a desired angular orientation. In an example, the rotation-drive assembly 144 includes at least one second drive-actuator 166 and at least one second power-transmitting component 170. The second drive-actuator 166 the second power-transmitting component 170 are configured to drive movement of the second moveable frame 136 along the second curved path 150 and, thus, drive rotational movement of the tilt platform 102 about the second orthogonal axis 116 and selectively orient the tilt platform 102 at a desired angular orientation.

In one or more examples, the first drive-actuator 164 is coupled to one of the base frame 132 or the first moveable frame 134 and the first power-transmitting component 168 is configured to operatively engage an opposite one of the base frame 132 or the first moveable frame 134 to drive movement of the first moveable frame 134 along the first curved path 148 relative to the base frame 132. In an example, the second drive-actuator 166 is coupled to one of the first moveable frame 134 or the second moveable frame 136 and the second power-transmitting component 170 is configured to operatively engage an opposite one of the first moveable frame 134 or the second moveable frame 136 to drive movement of the second moveable frame 136 along the second curved path 150 relative to the first moveable frame 134. In one or more examples, the first drive-actuator 164 and the first power-transmitting component 168 and/or the second drive-actuator 166 and the second power-transmitting component 170 have any one of various structural arrangements and/or operational configurations.

In an example, such as illustrated in FIG. 12, the first drive-actuator 164 is coupled to the first moveable frame 134. The first power-transmitting component 168 is operatively coupled with the first drive-actuator 164 and is coupled to the base frame 132. The first power-transmitting component 168 is configured to transfer power from the first drive-actuator 164 to the base frame 132 to move the first moveable frame 134 along the first curved path 148 relative to the base frame 132. The second drive-actuator 166 is coupled to the first moveable frame 134. The second power-transmitting component 170 is operatively coupled with the second drive-actuator 166 and is coupled to the second moveable frame 136. The second power-transmitting component 170 is configured to transfer power from the second drive-actuator 166 to the second moveable frame 136 to move the second moveable frame 136 along the second curved path 150 relative to the first moveable frame 134.

In one or more examples, the first drive-actuator 164 and/or the second drive-actuator 166 include, or take the form of, a rotary actuator, such as a pneumatic, hydraulic, or electromechanical rotary actuator. In one or more examples, the first power-transmitting component 168 and/or the second power-transmitting component 170 include, or take the form of, a rack and pinion assembly.

In one or more other examples, the first drive-actuator 164 and/or the second drive-actuator 166 include, or take the form of, a linear actuator, such as a pneumatic, hydraulic, or electromechanical linear actuator. In one or more examples, the first power-transmitting component 168 and/or the second power-transmitting component 170 include, or take the form of, a tie rod.

In one or more other examples, the first drive-actuator 164 and/or the second drive-actuator 166 include, or take the form of, a rotary actuator and the first power-transmitting component 168 and/or the second power-transmitting component 170 include, or take the form of, a worm gear.

Other operational configurations and/or structural arrangements of the first drive-actuator 164 and the first power-transmitting component 168 and/or the second drive-actuator 166 and the second power-transmitting component 170 are also contemplated.

Although not explicitly illustrated, in one or more examples, the tooling fixture 100 includes a power supply suitable to provide power (e.g., pneumatic pressure, hydraulic pressure, and/or electrical power) to the various components of the tooling fixture 100, such as the brake assembly 142 (e.g., the first brake 156 and/or the second brake 158) and the rotation-drive assembly 144 (e.g., the first drive-actuator 164 and/or the second drive-actuator 166).

Although not explicitly illustrated, in an example, the tooling fixture 100 includes a control unit operable to control selective actuation of the brake assembly 142 (e.g., the first brake 156 and/or the second brake 158) and the rotation-drive assembly 144 (e.g., the first drive-actuator 164 and/or the second drive-actuator 166). In an example, the first drive-actuator 164 and/or the second drive-actuator 166 include a position encoder that is configured to track the position and/or movement of the first moveable frame 134 and the second moveable frame 136, respectively.

In one or more examples, the brake assembly 142 and the rotation-drive assembly 144 are integrated into a single unit. In an example, the first brake 156 and the first drive-actuator 164 are integrated to form a first locking actuator. In an example, the second brake 158 and the second drive-actuator 166 are integrated to form a second locking actuator.

Referring generally to FIG. 1 and particularly to FIG. 13, in an example, the tooling fixture 100 includes a translation-drive assembly 146. The translation-drive assembly 146 is coupled to the frame assembly 104 and is configured to linearly move the tilt platform 102 along the third orthogonal axis 118 of the orthogonal axes 112 (e.g., along the Z-axis of the reference frame 206). Linear movement of the tooling fixture 100 enables the indexing point 106 to be selectively located along the third orthogonal axis 118 to the index location so that the workpiece 202 (FIGS. 1-3) is suitable supported by the tilt platform 102.

In an example, the translation-drive assembly 146 includes a telescoping tower. The translation-drive assembly 146 also includes a suitable drive-actuator and power-transmitting component that are operatively coupled with the telescoping tower and that are configured to selectively adjust (e.g., extend and retract) the telescoping tower.

Referring generally to FIGS. 1 and 14 and particularly to FIGS. 2-13, examples of a tooling system 200 for supporting the workpiece 202 during manufacturing are disclosed. In an example, the tooling system 200 includes a plurality of tooling fixtures 100. Each one, or at least one, of the tooling fixtures 100 (also identified individually as tooling fixture 100) includes the tilt platform 102. The tilt platform 102 includes the indexing point 106 that defines, or is defined by, the intersection of orthogonal axes 112. The tilt platform 102 is configured to support the workpiece 202. Each one, or at least one, of the tooling fixtures 100 includes the frame assembly 104. The frame assembly 104 is coupled to the tilt platform 102 and is configured to support rotational movement of the tilt platform 102 about two of the orthogonal axes 112. A location of the indexing point 106 is fixed relative to the reference frame 206 during rotational movement of the tilt platform 102. The frame assembly 104 allows or provides (e.g., unobstructed) access to the tilt platform 102 by the workpiece 202 from a direction opposite the frame assembly 104.

Referring generally to FIGS. 1 and 14 and particularly to FIGS. 2 and 3, in an example of the disclosed tooling system 200 (FIGS. 1 and 15), the frame assembly 104 of at least one of the tooling fixtures 100 includes the base frame 132. The frame assembly 104 of at least one of the tooling fixtures 100 includes the first moveable frame 134 that is coupled to the base frame 132 and that is moveable along the first curved path 148 (FIG. 2). The frame assembly 104 of at least one of the tooling fixtures 100 includes the second moveable frame 136 that is coupled to the first moveable frame 134 and that is moveable along the second curved path 150 (FIG. 3). The tilt platform 102 is coupled to the second moveable frame 136.

Referring generally to FIGS. 1 and 14 and particularly to FIGS. 6-12, in an example of the disclosed tooling system 200 (FIGS. 1 and 14), the frame assembly 104 of at least one of the tooling fixtures 100 includes at least one first curved rail 120 that defines the first curved path 148 (FIGS. 2 and 4) and that is configured to support movement of the first moveable frame 134 along the first curved path 148 relative to the base frame 132. The frame assembly 104 of at least one of the tooling fixtures 100 includes at least one second curved rail 122 that defines the second curved path 150 (FIGS. 3 and 5) and that is configured to support movement of the second moveable frame 136 along the second curved path 150 relative to the first moveable frame 134.

Referring generally to FIGS. 1 and 14 and particularly to FIGS. 6-11, in an example of the tooling system 200, each one, or at least one, of the tooling fixtures 100 includes the brake assembly 142 that is operatively coupled with the frame assembly 104 and that is configured to inhibit rotational movement of the tilt platform 102 about at least one of the two orthogonal axes 112.

Referring generally to FIGS. 1 and 14 and particularly to FIG. 12, in an example of the tooling system 200, each one, or at least one, of the tooling fixtures 100 includes the rotation-drive assembly 144 that is operatively coupled with the frame assembly 104 and that is configured to rotationally move the tilt platform 102 about at least one of the two orthogonal axes 112.

Referring generally to FIGS. 1 and 14 and particularly to FIG. 13, in an example of the tooling system 200, each one, or at least one, of tooling fixtures 100 includes the translation-drive assembly 146 that is coupled to the frame assembly 104 and that is configured to linearly move the tilt platform 102 along the third orthogonal axis 118 of the orthogonal axes 112.

Figure 15:
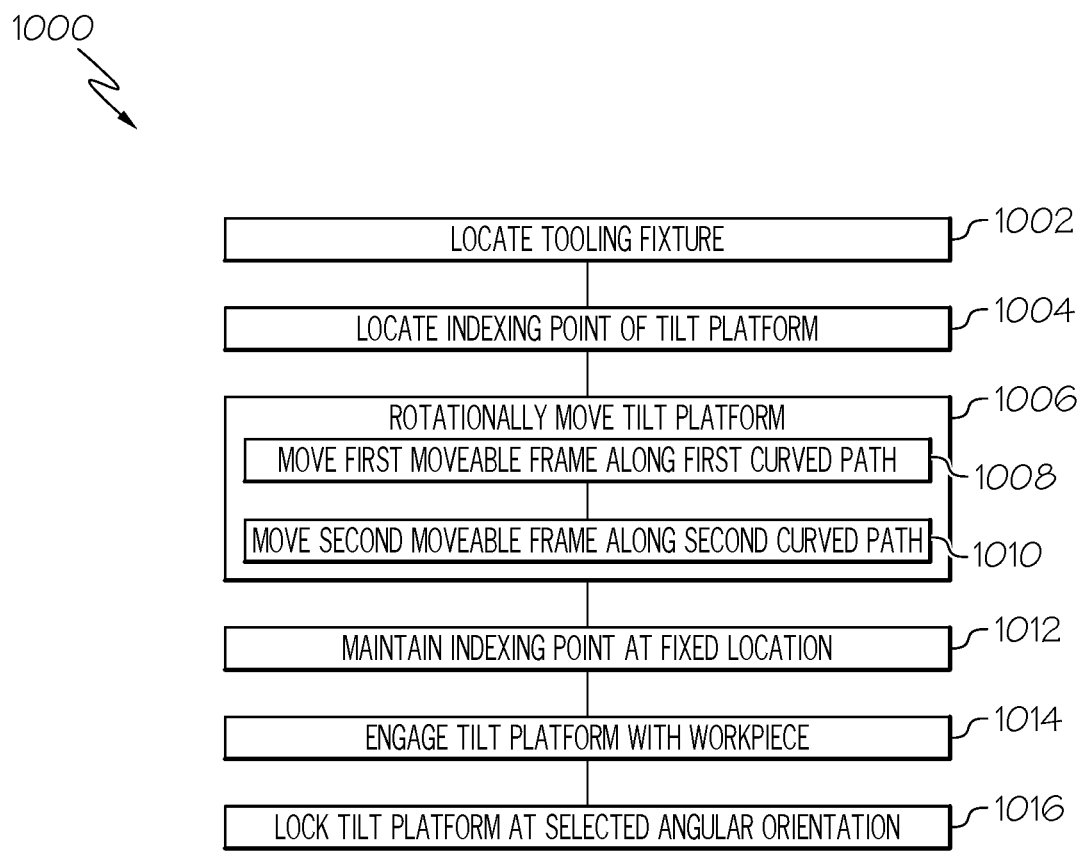
FIG. 15 is a flow diagram of an example of a method of supporting a workpiece.

Referring generally to FIGS. 1-14 and 16 and particularly to FIG. 15, examples of a method 1000 of supporting the workpiece 202 during manufacturing are disclosed. Examples of the method 1000 are performed using the disclosed tooling system 200 (FIGS. 14 and 16) that includes at least one of the disclosed tooling fixtures 100 (FIGS. 2-13).

In an example, the method 1000 includes a step of (block 1002) locating the tooling fixture 100 in the manufacturing environment 204. The tooling fixture 100 includes the tilt platform 102. The tilt platform 102 includes the indexing point 106 that defines, or that is defined by, the intersection of orthogonal axes 112. The tooling fixture 100 includes the frame assembly 104. The frame assembly 104 is coupled to the tilt platform 102 and is configured to support rotational movement of the tilt platform 102 about two of the orthogonal axes 112.

In an example, the method 1000 includes a step of (block 1004) locating the indexing point 106 of the tilt platform 102 relative to the reference frame 206 of the manufacturing environment 204. In an example, the step of (block 1004) locating the indexing point 106 of the tilt platform 102 relative to the reference frame 206 is performed using the translation-drive assembly 146 (FIG. 13) that is coupled to the tooling fixture 100. The translation-drive assembly 146 linearly moves the tilt platform 102 along the third orthogonal axis 118 of the orthogonal axes 112 (e.g., along the Z-axis of the reference frame 206) to selectively locate the indexing point 106. The indexing point 106 is used to index the tilt platform 102 when the tooling fixture 100 is supporting a workpiece 202 (FIGS. 1-3).

In an example, the method 1000 includes a step of (block 1006) rotationally moving the tilt platform 102 about at least one of the two orthogonal axes 112. Rotationally moving the tilt platform 102 about two of the orthogonal axes 112 relative to the frame assembly 104 selectively adjusts an angular orientation of the tilt platform 102.

According to method 1000, in an example, the step of (block 1006) rotationally moving the tilt platform 102 includes a step of (block 1008) moving the first moveable frame 134 of the frame assembly 104 along the first curved path 148 (FIGS. 2 and 4) of the frame assembly 104. In an example, moving the first moveable frame 134 along the first curved path 148 pivots the first moveable frame 134 about the indexing point 106, or the first orthogonal axis 114, relative to the base frame 132 of the frame assembly 104 and rotationally moves the tilt platform 102 about the first orthogonal axis 114, as illustrated in FIG. 2.

According to method 1000, in an example, the step of (block 1006) rotationally moving the tilt platform 102, additionally or alternatively, includes a step of (block 1010) moving the second moveable frame 136 of the frame assembly 104 along the second curved path 150 (FIGS. 3 and 5) of the frame assembly 104. Moving the second moveable frame 136 along the second curved path 150 pivots the second moveable frame 136 about the indexing point 106, or the second orthogonal axis 116, relative to the first moveable frame 134 and rotationally moves the tilt platform 102 about the second orthogonal axis 116, as illustrated in FIG. 3.

According to method 1000, in an example, the step of (block 1006) rotationally moving the tilt platform 102 includes a step of actively rotationally moving the tilt platform 102 about at least one of the two orthogonal axes 112 (e.g., the first orthogonal axis 114 and/or the second orthogonal axis 116) using the rotation-drive assembly 144 (FIGS. 1 and 12) that is operatively coupled with the frame assembly 104. In an example, the rotation-drive assembly 144 is selectively controlled to move at least one of the first moveable frame 134 along the first curved path 148 (FIGS. 2 and 4) relative to the base frame 132 and/or the second moveable frame 136 along the second curved path 150 (FIGS. 3 and 5) relative to the first moveable frame 134, which, in turn, respectively rotates the tilt platform 102 about at least one of the first orthogonal axis 114 and/or the second orthogonal axis 116 and selectively orient the tilt platform 102 to support the workpiece 202.

Figure 16:
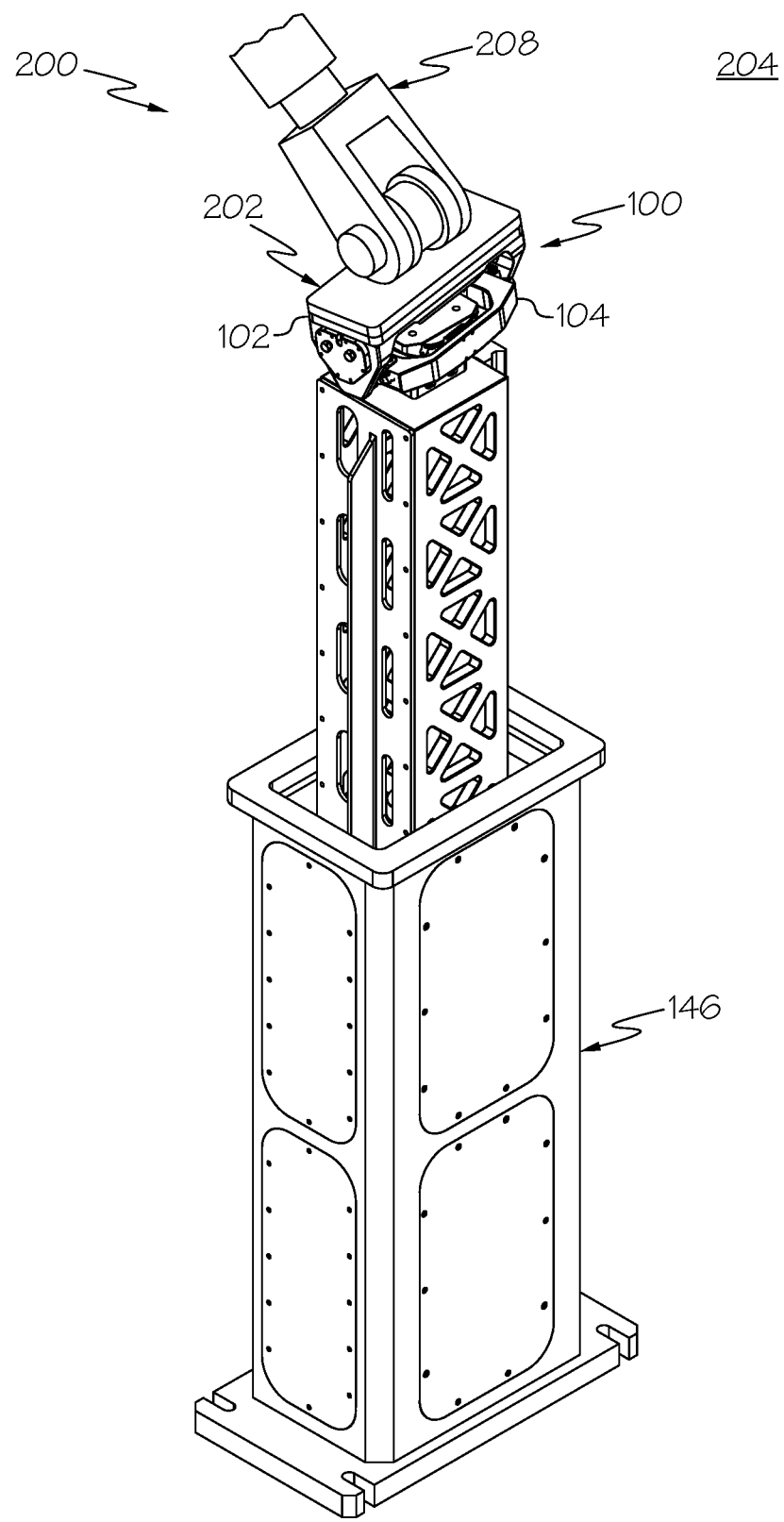
FIG. 16 is a schematic, perspective view of an example of the tooling system of FIG. 1.

According to the method 1000, in an example, the step of (block 1006) rotationally moving the tilt platform 102, alternatively, includes a step of passively rotationally moving the tilt platform 102 about at least one of the orthogonal axes 112 in response to engagement of the tilt platform 102 with the workpiece 202 or the robotic manipulator 208 (FIG. 16). As illustrated in FIG. 16, in an example, the robotic manipulator 208 engages the tilt platform 102 (e.g., either directly or with the workpiece 202) to move at least one of the first moveable frame 134 along the first curved path 148 (FIGS. 2 and 4) relative to the base frame 132 and/or the second moveable frame 136 along the second curved path 150 (FIGS. 3 and 5) relative to the first moveable frame 134, which, in turn, respectively rotates the tilt platform 102 about at least one of the first orthogonal axis 114 and/or the second orthogonal axis 116 and selectively orient the tilt platform 102 to support the workpiece 202.

In an example, the method 1000 includes a step of (block 1012) maintaining the indexing point 106 at a fixed location relative to the reference frame 206 when rotationally moving the tilt platform 102 about at least one of the orthogonal axes 112 (e.g., during the step of (block 1006) rotationally moving the tilt platform 102 about at least one of the orthogonal axes 112). The indexing point 106 is maintained at the selected (e.g., constant desired) location due to the first moveable frame 134 moving along the first curved path 148 and the second moveable frame 136 moving along the second curved path 150.

The method 1000 includes a step of (block 1014) engaging the tilt platform 102 with the workpiece 202 from a direction opposite the frame assembly 104. As illustrated in FIGS. 2 and 3, the frame assembly 104 is suitable positioned relative to the tilt platform 102 so that the tilt platform 102 is fully accessible by the workpiece 202 from a direction opposite to the frame assembly 104. In an example, as illustrated in FIG. 16, the workpiece 202 is placed into contact with the tilt platform 102 of the tooling fixture 100 using a robotic manipulator 208.

In an example, method 1000 includes a step of (block 1016) locking the tilt platform 102 at the selected angular orientation about the two orthogonal axes 112 (e.g., the first orthogonal axis 114 and the second orthogonal axis 116). In an example, the step of (block 1016) locking the tilt platform 102 at the selected angular orientation is performed using the brake assembly 142 (FIGS. 1 and 6-11) that is operatively coupled with the frame assembly 104. In example, the tilt platform 102 is locked at the selected angular orientation following the step of passively rotationally moving the tilt platform 102 about at least one of the orthogonal axes 112 in response to engagement of the tilt platform 102 with the workpiece 202 or the robotic manipulator 208 (FIG. 16).

In an example, the method 1000 also includes a step of holding, or otherwise securing and retaining, the workpiece 202 in position on the tilt platform 102. In an example, the step of holding the workpiece 202 in position is performed using the holding mechanism, such as an active vacuum applied to the workpiece 202 by the tilt platform 102, by clamping the workpiece 202 to the tilt platform 102, or any other suitable holding techniques.

Accordingly, examples of the disclosed tooling fixture 100 (FIGS. 1-13), the tooling system 200 (FIGS. 1, 14, and 16), and method 1000 (FIG. 15) are used to support and hold the workpiece 202 during a manufacturing operation. Generally, the workpiece 202 is any article or component that is subjected to a manufacturing operation. In an example, the workpiece 202 is a stringer of an aircraft. In one or more examples, the workpiece 202 includes a contour along at least one of its axes, such as a twist about its longitudinal axis and/or a bend or variable loft angle along its longitudinal axis. Examples of the tooling fixture 100 disclosed herein enable the tilt platform 102 to be quickly, accurately, and repeatably indexed at a proper index location to support the workpiece 202 and enable the tilt platform 102 to accommodate and complement any varying contours of the workpiece 202 while maintaining the index location.

Figure 17:
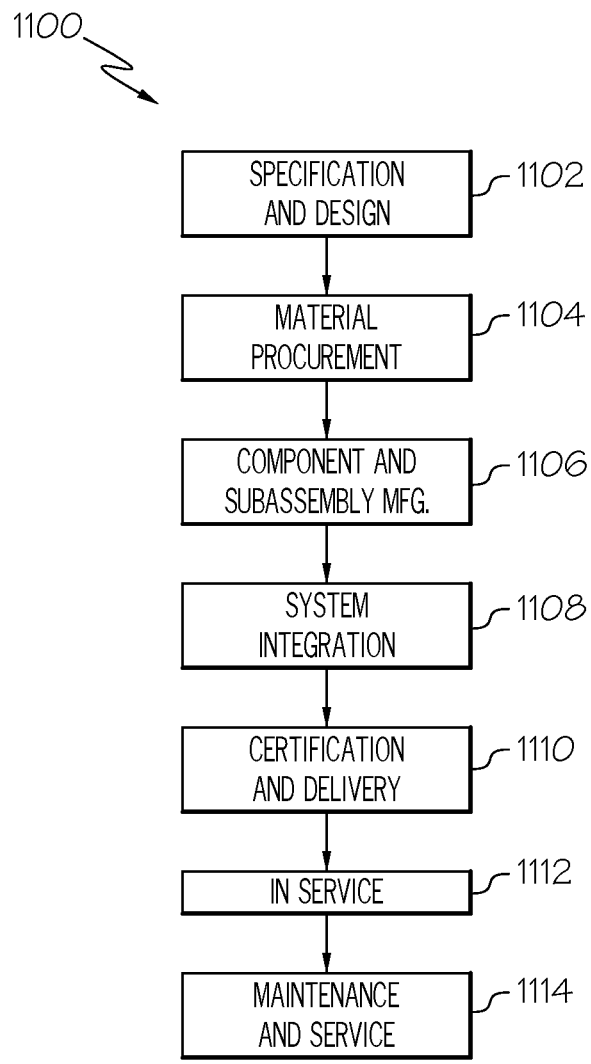
FIG. 17 is a flow diagram of an example aircraft production and service methodology.
Figure 18:
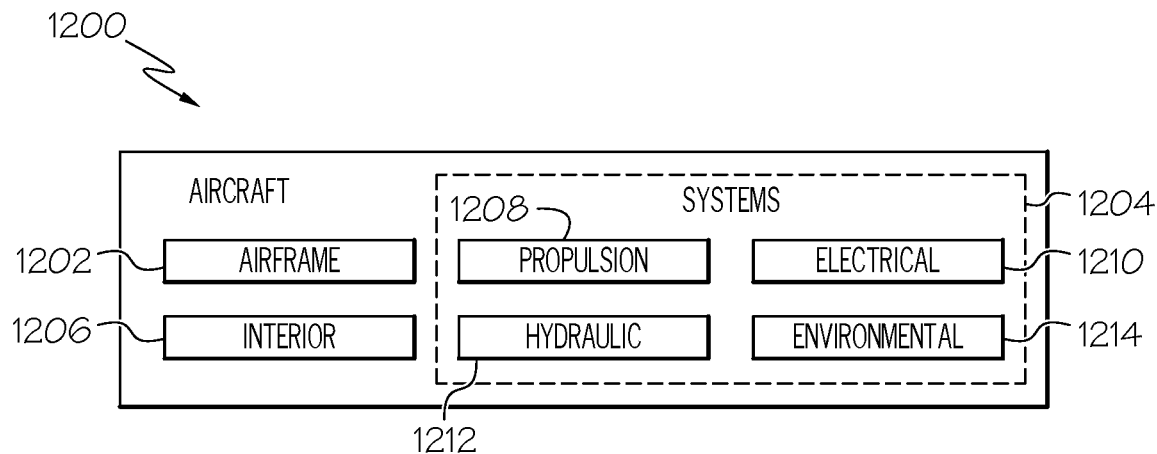
FIG. 18 is a schematic block diagram of an example of an aircraft.

Examples of the tooling fixture 100, the tooling system 200, and the method 1000 disclosed herein may find use in a variety of potential applications, particularly in the transportation industry, including for example, aerospace applications. Referring now to FIGS. 17 and 18, examples of the tooling fixture 100, the tooling system 200, and the method 1000 may be used in the context of an aircraft manufacturing and service method 1100, as shown in the flow diagram of FIG. 17 and an aircraft 1200, as shown in FIG. 18. Aircraft applications of the disclosed examples may include sanding surfaces of various components used in the manufacture of aircraft.

FIG. 18 is an illustrative example of an aircraft 1200. The aircraft 1200 includes an airframe 1202 and a plurality of high-level systems 1204 and an interior 1206. Examples of the high-level systems 1204 include one or more of a propulsion system 1208, an electrical system 1210, a hydraulic system 1212, and an environmental system 1214. In other examples, the aircraft 1200 may include any number of other types of systems.

The aircraft 1200 illustrated in FIG. 18 is an example of an aircraft having one or more structures or components that are supported during manufacturing using the disclosed tooling fixture 100 and tooling system 200 and/or according to the disclosed method 1000. In an example, the workpiece 202 is a structural member of the aircraft 1200 or is a portion of a structural assembly of the aircraft 1200. In an example, the workpiece 202 forms a part of the airframe 1202 of the aircraft 1200, such as a fuselage, a wing, a vertical stabilizer, a horizontal stabilizer, or another structure of the aircraft 1200, such as a skin panel, a stringer, a spar, a rib, a wing box, a stiffener, or other types of parts. In an example, the workpiece 202 forms the interior 1206 of the aircraft 1200, such as an interior panel.

As illustrated in FIG. 17, during pre-production, the method 1100 may include specification and design of aircraft 1200 (block 1102) and material procurement (block 1104). During production of the aircraft 1200, component and subassembly manufacturing (block 1106) and system integration (block 1108) of the aircraft 1200 may take place. Thereafter, the aircraft 1200 may go through certification and delivery (block 1110) to be placed in service (block 1112). The disclosed tooling fixture 100, tooling system 200, and method 1000 may form a portion of component and subassembly manufacturing (block 1106) and/or system integration (block 1108). Routine maintenance and service (block 1114) may include modification, reconfiguration, refurbishment, etc. of one or more systems of the aircraft 1200.

Each of the processes of the method 1100 illustrated in FIG. 17 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

Examples of the tooling fixture 100, the tooling system 200, and the method 1000 shown or described herein may be employed during any one or more of the stages of the manufacturing and service method 1100 shown in the flow diagram illustrated by FIG. 17. For example, components or subassemblies, such as those that include the workpiece 202, corresponding to component and subassembly manufacturing (block 1106) may be fabricated or manufactured in a manner similar to components or subassemblies produced while the aircraft 1200 (FIG. 18) is in service (block 1112). Also, one or more examples of the tooling fixture 100, the tooling system 200, and the method 1000 disclosed herein may be utilized during production stages (block 1108 and block 1110). Similarly, one or more examples of the tooling fixture 100, the tooling system 200, and the method 1000 disclosed herein may be utilized, for example and without limitation, while the aircraft 1200 is in service (block 1112) and during maintenance and service stage (block 1114).

Although an aerospace example is shown, the principles disclosed herein may be applied to other industries, such as the automotive industry, the space industry, the construction industry, and other design and manufacturing industries. Accordingly, in addition to aircraft, the principles disclosed herein may apply to other vehicle structures (e.g., land vehicles, marine vehicles, space vehicles, etc.) and stand-alone structures.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

Unless otherwise indicated, the terms "first", "second", etc. are used herein merely as labels, and are not intended to impose ordinal, positional, or hierarchical requirements on the items to which these terms refer. Moreover, reference to a "second" item does not require or preclude the existence of lower-numbered item (e.g., a "first" item) and/or a higher-numbered item (e.g., a "third" item).

For the purpose of this disclosure, the terms "coupled," "coupling," and similar terms refer to two or more elements that are joined, linked, fastened, connected, put in communication, or otherwise associated (e.g., mechanically, electrically, fluidly, optically, electromagnetically) with one another. In various examples, the elements may be associated directly or indirectly. As an example, element A may be directly associated with element B. As another example, element A may be indirectly associated with element B, for example, via another element C. It will be understood that not all associations among the various disclosed elements are necessarily represented. Accordingly, couplings other than those depicted in the figures may also exist.

As used herein, the phrase "at least one of", when used with a list of items, means different combinations of one or more of the listed items may be used and only one of each item in the list may be needed. For example, "at least one of item A, item B, and item C" may include, without limitation, item A or item A and item B. This example also may include item A, item B, and item C, or item B and item C. In other examples, "at least one of" may be, for example, without limitation, two of item A, one of item B, and ten of item C; four of item B and seven of item C; and other suitable combinations.

In FIGS. 1 and 18, referred to above, the blocks may represent elements, components, and/or portions thereof and lines, if any, connecting various elements and/or components may represent mechanical, electrical, fluid, optical, electromagnetic and other couplings and/or combinations thereof. Couplings other than those depicted in the block diagrams may also exist. Dashed lines, if any, connecting blocks designating the various elements and/or components represent couplings similar in function and purpose to those represented by solid lines; however, couplings represented by the dashed lines may either be selectively provided or may relate to alternative examples. Likewise, elements and/or components, if any, represented with dashed lines, indicate alternative examples. One or more elements shown in solid and/or dashed lines may be omitted from a particular example without departing from the scope of the present disclosure. Environmental elements, if any, are represented with dotted lines. Virtual (imaginary) elements may also be shown for clarity. Those skilled in the art will appreciate that some of the features illustrated in FIGS. 1 and 18, may be combined in various ways without the need to include other features described in FIGS. 1 and 18, other drawing figures, and/or the accompanying disclosure, even though such combination or combinations are not explicitly illustrated herein. Similarly, additional features not limited to the examples presented, may be combined with some or all of the features shown and described herein.

In FIGS. 15 and 17, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 15 and 17 and the accompanying disclosure describing the operations of the disclosed methods set forth herein should not be interpreted as necessarily determining a sequence in which the operations are to be performed. Rather, although one illustrative order is indicated, it is to be understood that the sequence of the operations may be modified when appropriate. Accordingly, modifications, additions and/or omissions may be made to the operations illustrated and certain operations may be performed in a different order or simultaneously. Additionally, those skilled in the art will appreciate that not all operations described need be performed.

Although various examples of the disclosed tooling fixture 100, tooling system 200, and method 1000 have been shown and described, modifications may occur to those skilled in the art upon reading the specification. The present application includes such modifications and is limited only by the scope of the claims.

What is claimed is:

1. A tooling fixture for supporting a workpiece in an indexed position, the tooling fixture comprising:
   a tilt platform comprising:
      a work-support surface; and
      an indexing point that is located on the work-support surface at an intersection of orthogonal axes that extend through a center of the work-support surface;
   a frame assembly coupled to the tilt platform; and
   a brake assembly coupled to the frame assembly, wherein:
      the frame assembly supports rotational movement of the tilt platform about a first orthogonal axis and a second orthogonal axis of the orthogonal axes and is configured to enable access to the work-support surface from a direction that is opposite the frame assembly;
      the tilt platform rotates is configured to passively rotate relative to the frame assembly about the first orthogonal axis and the second orthogonal axis to an indexed orientation in response to engagement of the workpiece with the work-support surface from the direction that is opposite the frame assembly;
      a location of the indexing point relative to a reference frame is fixed during rotational movement of the tilt platform about either one of the first orthogonal axis and the second orthogonal axis; and
      the brake assembly locks the tilt platform in the indexed orientation to inhibit further rotational movement of the tilt platform about the first orthogonal axis and the second orthogonal axis.

2. The tooling fixture of claim 1, wherein:
the frame assembly comprises:
   a base frame;
   a first moveable frame coupled to the base frame and moveable along a first curved path; and
   a second moveable frame coupled to the first moveable frame and moveable along a second curved path; and
the tilt platform is coupled to the second moveable frame.

3. The tooling fixture of claim 2, wherein:
movement of the first moveable frame along the first curved path relative to the base frame rotates the tilt platform about the first orthogonal axis; and
movement of the second moveable frame along the second curved path relative to the first moveable frame rotates the tilt platform about the second orthogonal axis.

4. The tooling fixture of claim 3, wherein:
the first curved path has a first center of curvature, located on the first orthogonal axis, and a first radius of curvature; and
the second curved path has a second center of curvature, located on the second orthogonal axis, and a second radius of curvature.

5. The tooling fixture of claim 4, wherein the first radius of curvature and the second radius of curvature are the same.

6. The tooling fixture of claim 4, wherein the first radius of curvature and the second radius of curvature are different.

7. The tooling fixture of claim 3, wherein the frame assembly further comprises:
- at least one first curved rail configured to support movement of the first moveable frame along the first curved path relative to the base frame; and
- at least one second curved rail configured to support movement of the second moveable frame along the second curved path relative to the first moveable frame.

8. The tooling fixture of claim 3, wherein:
the brake assembly comprises:
- a first brake coupled to the base frame and the first moveable frame; and
- a second brake coupled to the first moveable frame and the second movable frame;
the first brake selectively inhibits movement of the first moveable frame along the first curved path relative to the base frame; and
the second brake selectively inhibits movement of the second moveable frame along the second curved path relative to the first moveable frame.

9. The tooling fixture of claim 1, further comprising an actuator operatively coupled with the frame assembly and configured to rotationally move the tilt platform about at least one of the orthogonal axes.

10. The tooling fixture of claim 1, further comprising a translation-drive assembly coupled to the frame assembly and configured to linearly move the tilt platform along a third orthogonal axis of the orthogonal axes.

11. A tooling system for supporting a workpiece during manufacturing, the tooling system comprising:
a plurality of tooling fixtures, wherein at least one of the plurality of tooling fixtures comprises:
- a tilt platform comprising:
  - a work-support surface; and
  - an indexing point that is located on the work-support surface at an intersection of orthogonal axes that extend through a center of the work-support surface;
- a frame assembly coupled to the tilt platform; and
- a brake assembly coupled to the frame assembly; and
a robotic manipulator that is moveable relative to the at least one of the plurality of tooling fixtures;
wherein:
the work-support surface is configured to support the workpiece;
the frame assembly supports rotational movement of the tilt platform about a first orthogonal axis and a second orthogonal axis of the orthogonal axes and is configured to enable access to the work-support surface from a direction that is opposite the frame assembly;
the tilt platform is configured to passively rotate relative to the frame assembly about the first orthogonal axis and the second orthogonal axis to an indexed orientation in response to engagement of the robotic manipulator or the workpiece held by the robotic manipulator with the work-support surface from the direction that is opposite the frame assembly;
a location of the indexing point is fixed relative to a reference frame during rotational movement of the tilt platform about either one of the first orthogonal axis and the second orthogonal axis; and the brake assembly locks the tilt platform in the indexed orientation to inhibit further rotational movement of the tilt platform about the first orthogonal axis and the second orthogonal axis.

12. The tooling system of claim 11, wherein:
the frame assembly comprises:
- a base frame;
- a first moveable frame coupled to the base frame and moveable along a first curved path; and
- a second moveable frame coupled to the first moveable frame and moveable along a second curved path; and
the tilt platform is coupled to the second moveable frame.

13. The tooling system of claim 12, wherein:
movement of the first moveable frame along the first curved path relative to the base frame rotates the tilt platform about the first orthogonal axis of the orthogonal axes; and
movement of the second moveable frame along the second curved path relative to the first moveable frame rotates the tilt platform about the second orthogonal axis of the orthogonal axes.

14. The tooling system of claim 13, wherein:
the first curved path has a first center of curvature, located on the first orthogonal axis; and
the second curved path has a second center of curvature, located on the second orthogonal axis.

15. The tooling system of claim 12, wherein the frame assembly further comprises:
- at least one first curved rail configured to support movement of the first moveable frame along the first curved path relative to the base frame; and
- at least one second curved rail configured to support movement of the second moveable frame along the second curved path relative to the first moveable frame.

16. The tooling system of claim 11, wherein:
the brake assembly comprises:
- a first brake coupled to the base frame and the first moveable frame; and
- a second brake coupled to the first moveable frame and the second movable frame;
the first brake selectively inhibits movement of the first moveable frame along the first curved path relative to the base frame; and
the second brake selectively inhibits movement of the second moveable frame along the second curved path relative to the first moveable frame.

17. A method of supporting a workpiece during manufacturing, the method comprising steps of:
locating a tooling fixture in a manufacturing environment, wherein the tooling fixture comprises:
- a tilt platform comprising:
  - a work-support surface; and
  - an indexing point that is located on the work-support surface at an intersection of orthogonal axes that extend through a center of the work-support surface; and
- a frame assembly coupled to the tilt platform and configured to support rotational movement of the tilt platform about a first orthogonal axis and a second orthogonal axis of the orthogonal axes; and
- a brake assembly coupled to the frame assembly and configured to inhibit rotational movement of the tilt platform about the first orthogonal axis and the second orthogonal axis
locating the indexing point of the tilt platform at an indexed location relative to a reference frame of the manufacturing environment;

applying a force to the work-support surface by a robotic manipulator from a direction opposite the frame assembly;

passively rotationally moving the tilt platform about at least one of the first orthogonal axis and the second orthogonal axis of the orthogonal axes to an indexed orientation in response to the force applied by the robotic manipulator;

maintaining the indexing point at the indexed location relative to the reference frame when rotationally moving the tilt platform about either one of the first orthogonal axis and the second orthogonal axis of the orthogonal axes;

locking the tilt platform at the indexed orientation using the brake; and with the tilt platform in the indexed orientation, supporting the workpiece with the work-support surface.

18. The method of claim 17, wherein the step of rotationally moving the tilt platform comprises at least one of:

moving a first moveable frame of the frame assembly along a first curved path to pivot the first moveable frame about the indexing point relative to a base frame of the frame assembly; and moving a second moveable frame of the frame assembly along a second curved path of the frame assembly to pivot the second moveable frame about the indexing point relative to the first moveable frame.

19. The method of claim 18, wherein the step of locking the tilt platform at the indexed orientation comprises:

inhibiting movement of the first moveable frame along the first curved path relative to the base frame; and inhibiting movement of the second moveable frame along the second curved path relative to the first moveable frame.

20. The method of claim 17, wherein the step of applying the force to the work-support surface comprises engaging the work-support surface with robotic manipulator or the workpiece held by the robotic manipulator from the direction opposite the frame assembly.

* * * * *

UNITED STATES PATENT AND TRADEMARK OFFICE
CERTIFICATE OF CORRECTION

Page 1 of 1

PATENT NO. : 11,229,982 B2
APPLICATION NO. : 16/261727
DATED : January 25, 2022
INVENTOR(S) : McMillan It is certified that error appears in the above-identified patent and that said Letters Patent is hereby corrected as shown below:

In the Claims

In Claim 1 (Column 20, Line 29) delete the word "rotates"

Signed and Sealed this
First Day of March, 2022

Drew Hirshfeld
*Performing the Functions and Duties of the*
*Under Secretary of Commerce for Intellectual Property and*
*Director of the United States Patent and Trademark Office*